(12) United States Patent
Lee et al.

(10) Patent No.: US 11,292,996 B2
(45) Date of Patent: Apr. 5, 2022

(54) BEVERAGE MAKER AND METHOD FOR CONTROLLING BEVERAGE MAKER

(71) Applicant: LG ELECTRONICS INC., Seoul (KR)

(72) Inventors: Daewoong Lee, Seoul (KR); Yongbum Kim, Seoul (KR); Jinpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 16/695,314

(22) Filed: Nov. 26, 2019

(65) Prior Publication Data

US 2020/0165550 A1 May 28, 2020

(30) Foreign Application Priority Data

Nov. 27, 2018 (KR) ........................ 10-2018-0148408

(51) Int. Cl.
*C12C 11/00* (2006.01)
*C12C 13/10* (2006.01)
*A47J 31/40* (2006.01)

(52) U.S. Cl.
CPC .......... *C12C 11/006* (2013.01); *A47J 31/402* (2013.01); *A47J 31/40* (2013.01); *C12C 13/10* (2013.01)

(58) Field of Classification Search
CPC ..... C12C 13/10; C12C 11/075; C12C 11/006; C12C 11/07; C12G 1/0206; A47J 31/4403; A47J 31/462; A47J 31/40; A47J 31/402
See application file for complete search history.

(56) References Cited

U.S. PATENT DOCUMENTS

| 10,470,605 | B2 * | 11/2019 | Ergican | A47J 31/407 |
| 10,730,023 | B2 * | 8/2020 | Hyde | A47J 31/46 |

(Continued)

FOREIGN PATENT DOCUMENTS

| KR | 20-0135223 | 12/1997 |
| KR | 20-0301300 | 1/2003 |

(Continued)

OTHER PUBLICATIONS

International Search Report dated Aug. 23, 2019.

*Primary Examiner* — Reginald Alexander
(74) *Attorney, Agent, or Firm* — Ked & Associates LLP

(57) ABSTRACT

A beverage maker may include a fermentation tank having a space formed therein to make a beverage; a temperature controller configured to control a temperature of the fermentation tank; an air pump configured to supply air into the fermentation tank; a gas discharge channel connected with the fermentation tank and configured to discharge a portion of the air supplied into the fermentation tank; a temperature sensor configured to sense the temperature of the fermentation tank; and a controller configured to control the temperature controller to cool the fermentation tank accommodating a mixture including ingredients of the beverage while making the beverage, sense the temperature of the fermentation tank using the temperature sensor, terminate cooling of the fermentation tank when the sensed temperature is less than or equal to a reference temperature, and control the air pump to supply air into the fermentation tank.

11 Claims, 12 Drawing Sheets

(56) References Cited

U.S. PATENT DOCUMENTS

| | | | | |
|---|---|---|---|---|
| 2011/0226343 A1* | 9/2011 | Novak | ................ | B01F 3/04808 |
| | | | | 137/12.5 |
| 2013/0062366 A1* | 3/2013 | Tansey | ................. | B67D 1/0021 |
| | | | | 222/102 |
| 2015/0050392 A1* | 2/2015 | Stonehouse | ........ | B65D 85/8046 |
| | | | | 426/115 |
| 2019/0387920 A1* | 12/2019 | Anthony | ............. | A47J 31/0615 |

FOREIGN PATENT DOCUMENTS

| | | |
|---|---|---|
| KR | 10-2017-0130257 | 11/2017 |
| KR | 10-1816476 | 2/2018 |
| KR | 10-2018-0025100 | 3/2018 |

\* cited by examiner

BEVERAGE MAKER AND METHOD FOR CONTROLLING BEVERAGE MAKER

CROSS-REFERENCE TO RELATED APPLICATION(S)

This application claims priority under 35 U.S.C. 119 and 365 to Korean Patent Application No. 10-2018-0148408, filed in Korea on Nov. 27, 2018 in the Korean Intellectual Property Office, the disclosure of which is incorporated herein by reference.

BACKGROUND

1. Field

A beverage maker, and more particularly, a beverage maker which prevents backflow of bubbles generated when air is supplied to a beverage which is being made, and a method for controlling a beverage maker are disclosed herein.

2. Background

Beverages are collectively referred to as drinkable liquids, such as alcohol or tea. For example, beverages may be divided into various categories, such as water (a beverage) for quenching thirst, juice beverages with a unique flavor and taste, refreshing beverages giving a refreshing sensation, favorite beverages with a stimulant effect, or alcoholic beverages with an alcohol effect.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or may make beer at home (hereinafter "homemade" beer) produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and a flavoring additive, for example. Leaven, which is called yeast, may be added to liquid malt to ferment the liquid malt and assist production of alcohol and carbonic acid. Flavor additives are additives that enhance the taste of beer, such as fruit, syrup, and vanilla beans, for example.

Generally, homemade beer may include three stages or operations, namely, a wort stage or operation, a fermentation stage or operation, and an aging stage of operation, and it may take about two to three weeks from the wort stage or operation to the aging stage or operation. Maintaining an optimum temperature during the fermentation operation is important for homemade beer, and the easier the beer is to make, the more user convenience is improved. Recently, a beverage maker capable of easily making a beer-like beverage at home or in a bar has been gradually used, and such a beverage maker is configured to be convenient.

BRIEF DESCRIPTION OF THE DRAWINGS

Embodiments will be described in detail with reference to the following drawings in which like reference numerals refer to like elements, and wherein.

DETAILED DESCRIPTION

Figure 1:
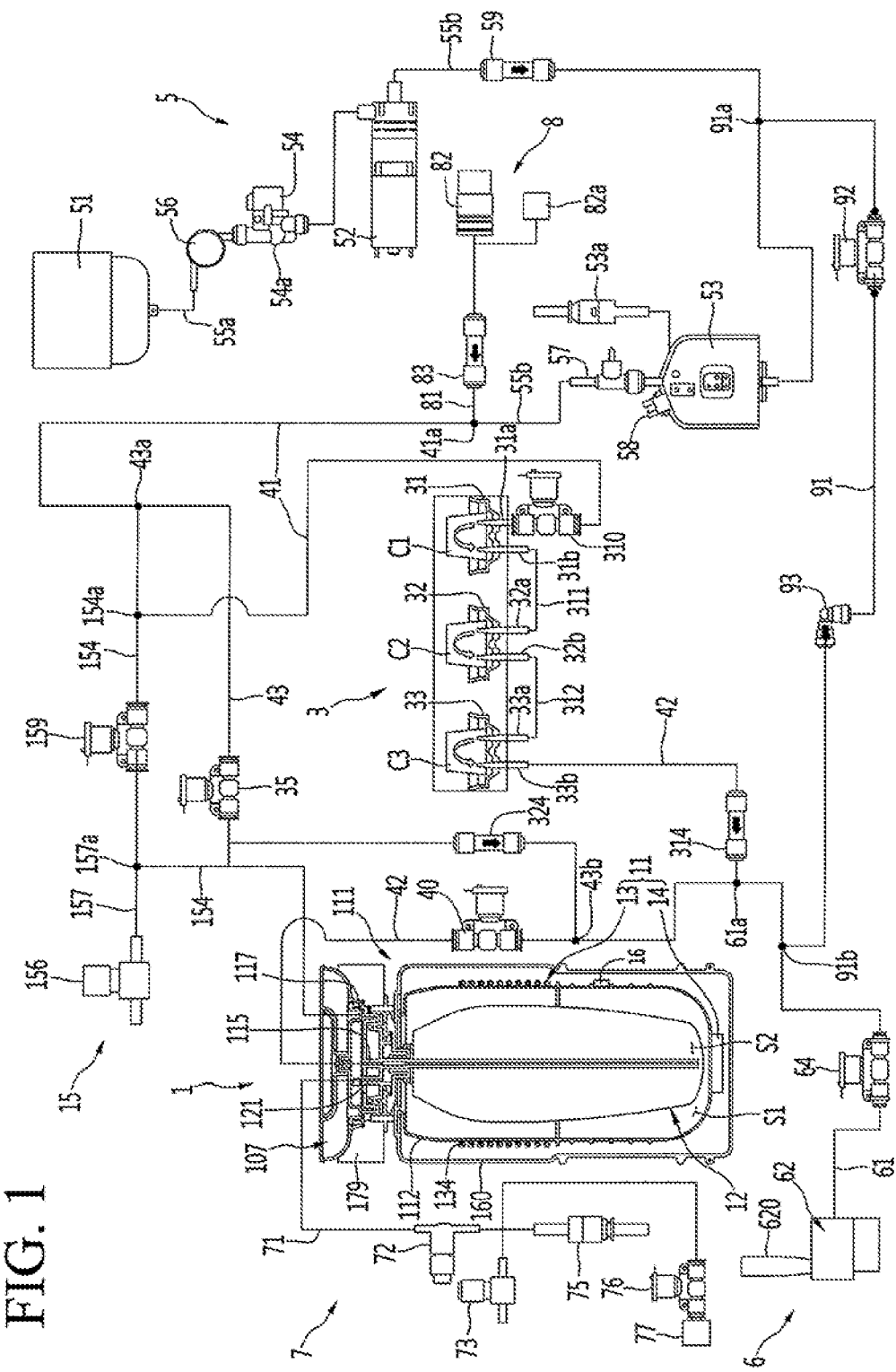
FIG. 1 is a schematic view of a beverage maker according to an embodiment.

Hereinafter, embodiments are described with reference to drawings. Wherever possible, like or the same reference numerals have been used to indicate like or the same elements, and repetitive disclosure has been omitted.

Although beer is exemplified as a beverage that is made using a beverage maker according to embodiments, the kind of beverage that can be made using the beverage maker is not limited to beer and various kinds of beverages may be made using the beverage maker according to embodiments.

FIG. 1 is a schematic view of a beverage maker according to an embodiment. The beverage maker may include a fermentation module 1. A beverage may be fermented in the fermentation module 1. The beverage maker may include a temperature controller that controls an inner temperature of the fermentation module 1.

The beverage maker may include a fluid supply module 5. The fluid supply module 5 may supply a fluid, such as water.

The beverage maker may include an ingredient supplier 3 provided with ingredient receivers 31, 32, and 33 in which ingredients required for making a beverage may be accommodated. The beverage maker may include main channels 41 and 42 that connect the fluid supply module 5 to the fermentation module 1.

The beverage maker may include a beverage dispenser 6 that dispenses the beverage made in the fermentation module 1 to the outside. The beverage dispenser 6 may be connected to second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector 8 that injects air. The air injector 8 may be connected to the fluid supply module 5 or first main channel 41. The air injector 8 may include an air pump 82.

The beverage maker may further include an air controller 15 that controls a pressure between an inner wall of a fermentation tank 112 and an outer surface of a fermentation container 12. The beverage maker may further include a sub channel 91. The sub channel 91 may connect the fluid supply module 5 to the beverage dispenser 6.

The fermentation module 1 may include a fermentation tank module 111 having an opening, and a fermentation lid 107 that opens and closes the opening. The fermentation tank module 111 may include a fermentation case 160 and fermentation tank 112 accommodated in the fermentation case 160 and having an inner space S1. Insulation (not shown) may be provided between the fermentation case 160 and the fermentation tank 112. The fermentation tank module 111 may further include a lid seating body 179 on which the fermentation lid 107 may be seated.

Each of the fermentation case 160 and the fermentation tank 112 may be provided as an assembly of a plurality of members or components. The fermentation case 160 may define an outer appearance of the fermentation tank module 111.

The fermentation lid 107 may seal an inside of the fermentation tank module 111 and be disposed on the fermentation tank module 111 to cover the opening. A main channel, more particularly, a main channel connecting portion 115 connected to the second main channel 42 may be provided in the fermentation lid 107.

A fermentation container 12 may be accommodated in the fermentation tank 112. The fermentation container 12 may be provided as a separate container so that beverage ingredients and a finished beverage do not stain the inner wall of the fermentation tank 112. The fermentation container 12 may be separably disposed on or in the fermentation tank 112. The fermentation container 12 may be seated on or in the fermentation tank 112 to ferment the beverage within the fermentation tank 112. After the fermentation container 12 is used, the fermentation container 12 may be removed from the fermentation tank 112.

The fermentation container 12 may be a pack containing ingredients for making a beverage. The fermentation container 12 may be made of a flexible material. Thus, the fermentation container 12 may be easily inserted into the fermentation tank 112 and be contracted and expanded by a pressure. However, embodiments are not limited thereto. For example, the fermentation container 12 may be made of a PET material.

The fermentation container 12 may have a beverage-making space S2 in which beverage ingredients may be accommodated, and the beverage made. The fermentation container 12 may have a size less than a size of inner space S1 of the fermentation tank 112.

The fermentation container 12 may be inserted into and accommodated in the fermentation tank 112 in a state in which the ingredients are contained in the fermentation container 12. The fermentation container 12 may be inserted into the fermentation tank 112 and then accommodated in the fermentation tank 112 in a state in which the fermentation lid 107 is opened.

The fermentation lid 107 may seal the fermentation tank 112 after the fermentation container 12 is inserted into the fermentation tank 112. The fermentation container 12 may assist fermentation of the ingredients in a state in which the fermentation container 12 is accommodated in the inner space S1 sealed by the fermentation container 112 and the fermentation lid 107. The fermentation container 12 may be expanded by pressure therein during the making of the beverage. The fermentation container 12 may be pressed by air within the fermentation tank 112 when the beverage contained in the fermentation container 12 is dispensed, and the air may be supplied between the inner surface of the fermentation tank 112 and the fermentation container 12.

The fermentation container 12 may be accommodated in the fermentation tank 112, and the fermentation lid 107 closed such that the main channel connecting portion 115 of the fermentation lid 107 connects the second main channel 42 and the beverage-making space S2 in the fermentation container 12.

Accordingly, fluid, such as water supplied from the fluid supply module 5 when a beverage is made may be introduced into the fermentation container 12 through the second main channel 42 and the main channel connecting portion 115. In addition, ingredients accommodated in the ingredient supplier 3 may be introduced into the fermentation container 12 through the second main channel 42 and the main channel connecting portion 115. In addition, the beverage made in the fermentation container 12 may pass through the main channel connecting portion 115, the second main channel 42, and the beverage dispensing channel 61, and may be dispensed to the outside through the dispenser 62.

The beverage maker according to an embodiment may introduce a fluid, such as water and ingredients which are supplied when the beverage is made, into the fermentation container 12 through the main channel connecting portion 115 formed on the fermentation lid 107, which may be opened and closed. In addition, the beverage maker may dispense the beverage accommodated in the fermentation container 12 to the dispenser 62 through the main channel connecting portion 115. That is, the beverage maker according to an embodiment may introduce a fluid, such as water and ingredients or dispense the beverage through the main channel connecting portion 115 formed in the fermentation lid 107 which may be opened and closed, thereby simplifying a configuration for connecting the second main channel 42 and the fermentation container 12.

The fermentation tank 112 may be disposed in the fermentation case 160. The fermentation tank 112 may have an outer circumferential surface and an outer bottom surface, which may be spaced apart from an inner surface of the fermentation case 160. The outer circumferential surface of the fermentation tank 112 may be spaced apart from an inner circumference of the fermentation case 160, and the outer bottom surface of the fermentation tank 112 may be spaced apart from an inner bottom surface of the fermentation case 160.

The insulation (not shown) may be provided between the fermentation case 160 and the fermentation tank 112. The insulation may be disposed in the fermentation case 160 to surround the fermentation tank 112. Thus, a temperature of the fermentation tank 112 may be maintained constant. The insulation may be made of a material, such as foamed polystyrene or polyurethane, which has a high thermal insulating performance and absorbs vibration.

The fermentation tank 112 may include a temperature sensor 16 that measures a temperature of the fermentation tank 112. The temperature sensor 16 may be mounted on the outer circumferential surface of the fermentation tank 112. The temperature sensor 16 may be disposed below an evaporator 134 wound around the fermentation tank 112.

A temperature controller 11 may change an inner temperature of the fermentation tank module 111. The temperature controller 11 may change a temperature of the fermentation tank 112. The temperature controller 11 may heat or cool the fermentation tank 112 to control or maintain a temperature of the fermentation tank 112 at an optimal temperature for fermenting the beverage.

The temperature controller 11 may include at least one of a refrigerant cycle device 13 and/or a heater 14. However, embodiments are not limited thereto. For example, the temperature controller 11 may include a thermoelement (TEM).

The refrigerant cycle device 13 may control the temperature of the fermentation tank 112 to cool a temperature of the fermentation tank 112. The refrigerant cycle device 13 may include a compressor 131 (referring to FIG. 6), a condenser, an expansion mechanism, and an evaporator 134.

The evaporator 134 may contact the outer circumferential surface of the fermentation tank 112. The evaporator 134 may be provided as an evaporation tube wound around the outer circumferential surface of the fermentation tank 112. The evaporator 134 may be accommodated between the fermentation tank 112 and the insulation to cool the fermentation tank 112 insulated by the insulation.

The temperature controller 11 may further include heater 14 that heats the fermentation tank 112. The heater 14 may contact the outer bottom surface of the fermentation tank 112. The heater 14 may be provided as a heat generation heater that generates heat when power is applied. The heater 14 may be provided as a plate heater. Thus, natural convection of a fluid may be generated inside of the fermentation tank 112 by the evaporator 134 and the heater 14, and temperature distribution inside of the fermentation tank 112 and the fermentation container 12 may be uniform.

As described above, the main channels 41 and 42 may include first main channel 41 that connects the fluid supply module 5 to the ingredient supplier 3 and second main channel 42 that connects the ingredient supplier 3 to the fermentation module 1. That is, the first main channel 41 may guide a fluid, such as water supplied from the fluid supply module 5 to the ingredient supplier 3, and the second main channel 42 may guide a mixture of ingredients and the fluid, which are extracted from the ingredient supplier 3, to the fermentation module 1.

The first main channel 41 may have a first end 41a connected to the fluid supply module 5 and a second end connected to the ingredient supplier 3, more particularly, an inlet 31a of an initial ingredient receiver 31, which will be described hereinafter.

An ingredient supply valve 310 that opens and closes the first main channel 41 may be installed in the first main channel 41. The ingredient supply valve 310 may be provided in the ingredient supplier 3.

The ingredient supply valve 310 may be opened to open the first main channel 41 when additives accommodated in the ingredient receivers 31, 32, and 33 are input. The ingredient supply valve 310 may also be opened to open the first main channel 41 when the ingredient receivers 31, 32, and 33 are cleaned.

The second main channel 42 may have a first end connected to the main channel connecting portion 115 of the fermentation module 1 and a second end connected to the ingredient supplier 3, more particularly, an outlet 33b of a final ingredient receiver 33, which will be described hereinafter.

A main valve 40 that opens and closes the second main channel 42 may be installed in the second main channel 42. Also, a main check valve 314 that allows fluid to flow from the ingredient supplier 3 to the fermentation module 1 may be installed in the second main channel 42. That is, the main check valve 314 may prevent the fluid from flowing back to the ingredient supplier 3. The main check valve 314 may be disposed between the main valve 40 and the ingredient supplier 3 with respect to the second main channel 42.

The main valve 40 may be opened to open the second main channel 42 when fluid is supplied to the fermentation container 12. The main valve 40 may be closed to close the second main channel 42 while the fermentation tank 112 is cooled. The main valve 40 may be opened to open the second main channel 42 when air is injected into the fermentation container 12. The main valve 40 may be opened to open the second main channel 42 when ingredients are supplied into the fermentation container 1. The main valve 40 may be closed to seal the inside of the fermentation container 12 during fermentation of the ingredients. The main valve 40 may be closed to seal the inside of the fermentation container 12 when the beverage is aged and stored. The main valve 40 may be opened to open the second main channel 42 when the beverage is dispensed by the beverage dispenser 6. The beverage within the fermentation container 1 may pass through the main valve 40 to flow to the beverage dispenser 6.

The main channels 41 and 42 may be provided as one continuous channel when the beverage maker does not include the ingredient supplier 3. When the beverage maker includes the ingredient supplier 3, the beverage maker may further include bypass channel 43 configured to allow fluid or air to bypass the ingredient receivers 31 and 32.

The bypass channel 43 may bypass the ingredient receivers 31, 32, and 33 and then be connected to the first main channel 41 and the second main channel 42. The bypass channel 43 may have a first end 43a connected to the first main channel 41 and a second end 43b connected to the second main channel 42. The first end 43a of the bypass channel 43 may be connected to the first main channel 41 between the fluid supply module 5 and the ingredient supply valve 310 and the second end 43b may be connected to the second main channel 42 between the main valve 40 and the ingredient supplier 3.

A bypass valve 35 that opens and closes the bypass channel 43 may be installed in the bypass channel 43. The bypass valve 35 may be opened to open the bypass channel 43 when fluid supplied from the fluid supply module 5 is supplied to the fermentation container 12. The bypass valve 35 may be opened to open the bypass channel 43 when air injected from the air injector 8 is supplied to the fermentation container 12. The bypass valve 35 may be opened to open the bypass channel 43 when the bypass channel 43 is cleaned.

A bypass check valve 324 that allows fluid to flow from the first main channel 41 to the second main channel 42 may be installed in the bypass channel 43. That is, the fluid may flow only from the first main channel 41 to the second main channel 42, but may not flow in the opposite direction. The bypass check valve 324 may be disposed between the bypass valve 35 and the second main channel 42 with respect to the bypass channel 43.

When beer is made using the beverage maker, ingredients for making the beer may include water, malt, yeast, hop, and flavoring additives, for example. The beverage maker may include both the ingredient supplier 3 and the fermentation container 12. The ingredients for making the beverage may be accommodated separately in the ingredient supplier 3 and the fermentation container 12. That is, a portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the fluid supplied from the fluid supply module 5 and mixed with the portion of the ingredients accommodated in the fermentation container 12.

A main ingredient that is essential for making a beverage may be accommodated in the fermentation container 12, and the other ingredients or additives added to the main ingredient may be accommodated in the ingredient supplier 3. In this case, the additives accommodated in the ingredient supplier 3 may be mixed with fluid supplied from the fluid supply module 5 and supplied to the fermentation container 12 and then mixed with the main ingredient accommodated in the fermentation container 12.

An amount of the main ingredient accommodated in the fermentation container 12 may be greater than an amount of other ingredients. For example, when beer is made, the main material may be malt of malt, yeast, hop, and flavoring additives. Also, the additive accommodated in the ingredient supplier 3 may be the other ingredients except for the malt of the ingredients for making beer, for example, yeast, hop, and flavoring additives.

According to one embodiment, the beverage maker may not include the ingredient supplier 3 but may include the fermentation container 12. In this case, the main ingredient may be accommodated in the fermentation container 12, and the user may directly put the additives into the fermentation container 12.

If the beverage maker includes both the ingredient supplier 3 and the fermentation container 12, the beverage may be more easily made. Hereinafter, a case in which the beverage maker includes both the ingredient supplier 3 and the fermentation container 12, will be described as an example. However, embodiments are not limited to the case in which the beverage maker includes both the ingredient supplier 3 and the fermentation container 12.

The ingredients within the fermentation container 12 may be fermented over time, and the beverage made in the fermentation container 12 may flow to the second main channel 42 through the main channel connecting portion 115 and also flow from the second main channel 42 to the beverage dispenser 6 to be dispensed.

The ingredients that are necessary for making the beverage may be accommodated in the ingredient supplier 3, and the fluid supplied from the fluid supply module 5 may pass through the ingredient supplier 3. For example, when the beverage made in the beverage maker is beer, the ingredients accommodated in the ingredient supplier 3 may be yeast, hop, and flavoring additives, for example.

The ingredients accommodated in the ingredient supplier 3 may be directly accommodated in the ingredient receivers 31, 32, and 33 provided in the ingredient supplier 3. At least one ingredient receiver 31, 32, and 33 may be provided in the ingredient supplier 3. Also, a plurality of ingredient receivers 31, 32, and 33 may be provided in the ingredient supplier 3. The plurality of ingredient receivers 31, 32, and 33 may be partitioned with respect to each other.

Inlets 31a, 32a, and 33a, through which the fluid may be introduced, and outlets 31b, 32b, and 33b, through which the fluid may be discharged, may be provided in the ingredient receivers 31, 32, and 33, respectively. The fluid introduced into the inlet of one ingredient receiver may be mixed with the ingredients within the ingredient receiver and then discharged through the outlet.

The ingredients accommodated in the ingredient supplier 3 may be accommodated in ingredient containers C1, C2, and C3. The ingredient containers C1, C2, and C3 may be accommodated in the ingredient receivers 31, 32, and 33, and each of the ingredient receivers 31, 32, and 33 may be referred to as an "ingredient container mount". The ingredient containers C1, C2, and C3 may be a capsule, or a pod, for example; however, embodiments are not limited thereto.

When the ingredients are accommodated in the ingredient containers C1, C2, and C3, the ingredient supplier 3 may be configured so that the ingredient containers C1, C2, and C3 may be seated therein and withdrawn therefrom. The ingredient supplier 3 may be provided as an ingredient container kit assembly in which the ingredient containers C1, C2, and C3 may be separably accommodated.

For example, a first additive, a second additive, and a third additive may be accommodated in the ingredient supplier 3. The first additive may be yeast, the second additive may be hop, and the third additive may be a flavoring additive. The ingredient supplier 3 may include a first ingredient container mount 31 in which a first ingredient container C1 containing the first additive may be accommodated, a second ingredient container mount 32 in which a second ingredient container C2 containing the second additive may be accommodated, and a third ingredient container mount 33 in which a third ingredient container C3 containing the third additive may be accommodated.

The ingredients contained in the ingredient receivers or the ingredient containers C1, C2, and C3 may be extracted by a fluid pressure of fluid supplied from the fluid supply module 5. When the ingredients are extracted by the fluid pressure, the fluid supplied from the fluid supply module 5 to the first main channel 41 may pass through the ingredient receivers or the ingredient containers C1, C2, and C3 and then may be mixed with the ingredients, and the ingredients accommodated in the ingredient receivers or the ingredient containers C1, C2, and C3 may flow to the second main channel together with the fluid.

A plurality of different additives may be accommodated separately in the ingredient supplier 3. For example, when beer is made, the plurality of additives accommodated in the ingredient supplier 3 may be yeast, hop, and a flavoring additive, which may be accommodated separated from each other.

When the plurality of ingredient receivers is provided in the ingredient supplier 3, the plurality of ingredient receivers 31, 32, and 33 may be connected in series to each other in a flow direction of the fluid. That is, the ingredient supplier 3 may include at least one connecting channel 311 and 312 that connects the outlet of one ingredient receiver of the plurality of ingredient receivers 31, 32, and 33 to the inlet of another ingredient receiver.

Also, the plurality of ingredient receivers 31, 32, and 33 may include an initial ingredient receiver 31 and a final ingredient receiver 33. The plurality of ingredient receivers 31, 32, and 33 may further include an intermediate ingredient receiver 32.

The inlet 31a of the initial ingredient receiver 31 may be connected to the first main channel 41, and the outlet 33b of the final ingredient receiver 33 may be connected to the second main channel 42. The intermediate ingredient receiver 32 may be disposed between the first ingredient receiver 31 and the second ingredient receiver 33 in the flow direction of the fluid. The inlet 32a and the outlet 32b of the intermediate ingredient receiver 32 may be connected to different connecting channels 311 and 312 from each other.

As illustrated in FIG. 1, when three ingredient receivers are provided in the ingredient supplier 3, the outlet 31b of the initial ingredient receiver 31 may be connected to the inlet 32a of the intermediate ingredient receiver 32 through the first connecting channel 311, and the outlet 32b of the intermediate ingredient receiver 32 may be connected to the inlet 33a of the final ingredient receiver 33 through the second connecting channel 312. The fluid introduced into the inlet 31a of the initial ingredient receiver 31 through the first main channel 41 may flow to the first connecting channel 311 through the outlet 31b together with the first additive accommodated in the initial ingredient receiver 31.

The fluid, which may be a mixture of water and a first additive, introduced into the inlet 32a of the intermediate ingredient receiver 32 through the first main channel 311 may flow to the second connecting channel 312 through the outlet 32b together with the second additive accommodated in the intermediate ingredient receiver 32. The fluid, which may now be a mixture of water and first and second additives, introduced into the inlet 33a of the final ingredient receiver 33 through the second main channel 312 may flow to the second connecting channel 42 through the outlet 33b together with a third additive accommodated in the final ingredient receiver 33. The fluid, which may now be a mixture of water and first, second, and third additives, discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient receiver is not provided, two ingredient receivers may be provided in the ingredient supplier 3. In this case, one ingredient receiver may be the initial ingredient receiver, and the other ingredient receiver may be the final ingredient receiver. The outlet of the initial ingredient receiver and the inlet of the final ingredient receiver may be connected to each other by the connecting channel.

For another example, when a plurality of the intermediate ingredient receiver is provided, four or more ingredient receivers may be provided in the ingredient supplier 3. In this case, one ingredient receiver may be the initial ingredient receiver, another ingredient receiver may be the final ingredient receiver, and the remaining ingredient receivers may be intermediate ingredient receivers. In this case, as the connection between the ingredient receivers in series is easily understood by a person skilled in the art, detailed descriptions thereof have been omitted.

As the plurality of ingredient receivers 31, 32, and 33 may be connected in series to each other, the channel configuration of the ingredient supplier 3 may be simplified. Further, as the additives contained in the ingredient containers C1, C2, and C3 may be extracted all at once, a time taken to extract the additives may decrease. Furthermore, as the user does not have to worry about a mounting order of the ingredient containers C1, C2, and C3, malfunction due to the mounting of the ingredient containers C1, C2, and C3 in an erroneous order may not occur. Also, fluid leakage in the ingredient supplier 3 may be minimized to improve reliability.

When the ingredients accommodated in the ingredient supplier 3 are accommodated in the ingredient containers C1, C2, and C3, the initial ingredient receiver 31 may be referred to as "an initial ingredient container mount", the intermediate ingredient receiver 32 may be referred to as an "intermediate ingredient container mount", and the final ingredient receiver 33 may be referred to as a "final ingredient container mount".

The fluid supply module 5 may include a tank 51, a pump 52 that pumps a fluid, such as water within the tank 51, and a heater 53 that heats the fluid pumped by the pump 52. The tank 51 and the pump 52 may be connected to a tank discharge channel 55a, and the fluid contained in the tank 51 may be introduced into the pump 52 through the tank discharge channel 55a.

The pump 52 and a first end of the first main channel 41 may be connected to a supply channel 55b, and the fluid discharged from the pump 52 may be guided to the first main channel 41 through the supply channel 55b. A flow meter 56 that measures a flow rate of the fluid discharged from the tank 51 may be installed in the tank discharge channel 55a.

A flow rate control valve 54 that controls a flow rate of the fluid discharged from the tank 51 may be installed in the tank discharge channel 55a. The flow rate control valve 54 may include a step motor.

A thermistor 54a that measures a temperature of the fluid discharged from the tank 51 may be installed in the tank discharge channel 55a. The thermistor 54a may be built into the flow rate control valve 54.

A check valve 59 that prevents the fluid from flowing back to the pump 52 may be installed in the supply channel 55b. Also, the heater 53 may be installed in the supply channel 55b. A thermal fuse 58 that interrupts a circuit to cutoff current applied to the heater 53 when a temperature is high may be installed in the heater 53.

The fluid supply module 5 may further include a safety valve 53a. The safety valve 53a may communicate with an inside of a heater case of the heater 53. The safety valve 53a may restrict a maximum inner pressure of the heater case. For example, the safety valve 53a may restrict the maximum inner pressure of the heater case to a pressure of about 3.0 bar.

The fluid supply module 5 may further include a temperature sensor 57 that measures a temperature of the fluid passing through the heater 53. The temperature sensor 57 may be installed in the heater 53. Alternatively, the temperature sensor 57 may be disposed at a portion of the supply channel 55b downstream of the heater 53 in the flow direction of fluid. Also, the temperature sensor 57 may be installed in the first main channel 41.

When the pump 52 is driven, the fluid within the tank 51 may be introduced into the pump 52 through the tank discharge channel 55a, and the fluid discharged from the pump 52 may be heated in the heater 53 while flowing through the supply channel 55b and may then be guided to the first main channel 41.

The beverage dispenser 6 may be connected to the second main channel 42. The beverage dispenser 6 may include the dispenser 62 that dispenses a finished beverage and the beverage dispensing channel 61 that connects the dispenser 62 to the second main channel 42.

The beverage dispensing channel 61 may have a first end 61a connected between the main check valve 314 and the main valve 40 with respect to the second main channel 42 and a second end connected to the dispenser 62. A beverage dispensing valve 64 that opens and closes the beverage dispensing channel 61 may be installed in the beverage dispensing channel 61.

The beverage dispensing valve 64 may be opened to open the beverage dispensing channel 61 when the beverage is dispensed. The beverage dispensing valve 64 may be opened to open the beverage dispensing channel 61 when residual fluid is removed. The beverage dispensing valve 64 may be opened to open the beverage dispensing channel 61 when the beverage dispenser is cleaned.

An anti-foaming portion (not shown) may be provided in the beverage dispensing channel 61, and an amount of foam of the beverage flowing from the second main passage 42 to the beverage dispensing channel 61 may be minimized while passing through the anti-foaming portion. A mesh that filters the foam may be provided in the anti-foaming portion (not shown).

When the beverage is dispensed, the beverage dispensing valve 64 may be opened. When the beverage is not dispensed, the beverage dispensing valve 64 may be maintained in a closed state.

The gas discharger 7 may be connected to the fermentation module 1 to discharge gas generated in the fermentation container 12. The gas discharger 7 may include a gas discharge channel 71 connected to the fermentation module 1, a gas pressure sensor 72 installed in the gas discharge channel 71, and a gas discharge valve 73 connected downstream of the gas pressure sensor 72 in the gas discharge channel 71 in a gas discharge direction.

The gas discharge channel 71 may be connected to the fermentation module 1, more particularly, the fermentation lid 107. A gas discharge channel connecting portion 121 to which the gas discharge channel 71 may be connected may be provided in the fermentation lid 107.

The gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be opened when the air is injected into the fermentation container 12 by the air injector 8. The beverage maker may uniformly mix the malt with the fluid by injecting air into the fermentation container 12. Foam generated in the liquid malt may be discharged from an upper portion of the fermentation container 12 to the outside through the gas discharge channel 71 and the gas discharge valve 73. The gas discharge valve 73 may be opened during the fermentation process and then closed.

The gas discharger 7 may further include a safety valve 75 connected to the gas discharge channel 71. The safety valve 75 may be connected downstream of the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76. The pressure release valve 76 may be connected to the gas discharge channel 71. The pressure release valve 76 and the gas discharge valve 73 may be selectively opened/closed. The gas discharge channel 71 may be branched to be respectively connected to the gas discharge valve 73 and the pressure release valve 76.

A noise reducing device 77 may be mounted on the pressure release valve 76. The noise reducing device 77 may include at least one of an orifice structure or a muffler structure, for example.

Even though the pressure release valve 76 is opened, an inner pressure of the fermentation container 12 may gradually decrease due to the noise reducing device 77. When fermentation of the beverage progresses, the pressure release valve 76 may be opened to release the pressure in a state in which the inner pressure of the fermentation container 12 increases. The noise reducing device 77 may effectively reduce noise generated due to a difference in pressure between the inside and outside of the fermentation container 12. The pressure release valve 76 may be open/close-controlled in a fermentation operation with relatively high internal pressure.

The air injector 8 may be connected to the supply channel 55b or the first main channel 41 to inject air. Hereinafter, for convenience of description, a case in which the air injector 8 is connected to the supply channel 55b will be described as an example.

The air injector 8 may be connected to an opposite side of the sub channel 91, which will be described hereinafter, with respect to the heater 53. The air injected by the air injector 8 may pass through the heater 53 to flow to the sub channel 91 together with residual fluid within the heater 53. Thus, the residual fluid within the heater 53 may be removed to maintain a clean state of the heater 53.

Alternatively, air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, air injected from the air injector 8 to the first main channel 41 may be guided to the ingredient supplier 3 to flow to the ingredient container mounts 31, 32, and 33. Residual fluid or residue within the ingredient containers C1, C2, and C3 or the ingredient container mounts 31, 32, and 33 may flow to the second main channel 42 due to air injected by the air injector 8. The ingredient containers C1, C2, and C3 and the ingredient container mounts 31, 32, and 33 may be cleanly maintained by the air injected by the air injector 8.

The air injector 8 may include an air injection channel 81 connected to the supply channel 55b or the first main channel 41 and the air pump 82 connected to the air injection channel 81. The air pump 82 may pump air to the air injection channel 81. An air injection check valve 83 that prevents fluid flowing to the supply channel 55b by the pump 52 from being introduced into the air pump 82 through the air injection channel 81 may be installed in the air injection channel 81.

The air injector 8 may further include an air filter 82a. The air filter 82a may be provided in a suction portion of the air pump 82, and thus, external air may be suctioned into the air pump 82 by passing through the air filter 82a. Thus, the air pump 82 may inject clean air into the air injection channel 81.

The air controller 15 may control a pressure between the inner wall of the fermentation tank 112 and the outer surface of the fermentation container 12. The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1, and an exhaust channel 157 connected to the air supply channel 154 to exhaust the air to the outside. The air supply channel 154 may have a first end connected to the first main channel 41 and a second end connected to the fermentation module 1.

The air supply channel 154 may be connected to the fermentation module 1, more particularly, the fermentation lid 107. An air supply channel connecting portion 117 to which the air supply channel 154 may be connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154. The air injector 8 may function as an air supplier that supplies air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112. The beverage within the fermentation container 12 may be pressed by the fermentation container 12 pressed by the air. When the main valve 40 and the beverage dispensing valve 64 are opened, the beverage may pass through the main channel connecting portion 115 to flow to the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may occur between the fermentation container 12 and the fermentation tank 112.

The air pump 82 may be maintained in an off state while the beverage is dispensed. When the beverage is completely dispensed, the air pump 82 may be driven for a next beverage dispensing and then stopped.

Thus, when the beverage is finished, the beverage maker may dispense the beverage within the fermentation container 12 to the beverage dispenser 6 in a state in which the fermentation container 1 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not be connected to the first main channel 41. However, the injection of air into the fermentation container 12 by the air pump 82 and the supplying of air into the space between the fermentation container 12 and the fermentation tank 112 may be combined with each other to realize a compact product and reduce manufacturing costs.

The exhaust channel 157 may function as an air exhaust passage, through which the air between the fermentation container 12 and the fermentation tank 112 may be exhausted to the outside, together with a portion of the air supply channel 154. The exhaust channel 157 may be disposed outside of the fermentation module 1. The exhaust channel 157 may be connected to a portion of the air supply channel 154, which is disposed outside of the fermentation tank 112.

The air supply channel 154 may include a first channel connected between a connecting portion 157a connected to the first main channel 41 and the exhaust channel 157 and a second channel connected between the connecting portion 154a connected to the exhaust channel 157 and the air supply channel connecting portion 117. The first channel may be an air supply channel that guides the air pumped by the air pump 82 to the second channel. Also, the second channel may be an air supply and exhaust-combined channel that supplies the air passing through the air supply channel into the space between the fermentation tank 112 and the fermentation container 12 or guides the air discharged from the space between the fermentation tank 112 and the fermentation container 12 the connecting channel 157.

The exhaust channel 157 may be connected to the exhaust valve 156 that opens and closes the exhaust channel 157. The exhaust valve 156 may be opened so that the air between the fermentation container 12 and the fermentation tank 112 may be exhausted to the outside when the fermentation container 12 is expanded while the beverage is made. The exhaust valve 156 may be opened when the fluid is supplied by the fluid supply module 5. The exhaust valve 156 may be opened when the air is injected by the air injector 8.

The exhaust valve 156 may be opened so that the air between the fermentation container 12 and the fermentation tank 112 is exhausted when the beverage within the fermentation container 12 is completely dispensed. The user may take the fermentation container 12 out of the fermentation tank 112 when the beverage is completely dispensed. This is done because safety accidents occur when the inside of the fermentation tank 112 is maintained at a high pressure. The exhaust valve 156 may be opened when the beverage within the fermentation container 12 is completely dispensed.

The air controller 15 may further include an air supply valve 159 that restricts the air pumped by the air pump 82 and supplied between the fermentation container 12 and the fermentation tank 112. The air supply valve 159 may be installed in the air supply channel 154. That is, the air supply valve 159 may be installed between the connecting portion 154a of the first main channel 41 and the connecting portion 157a of the exhaust channel 157 in the air supply channel 154.

The sub channel 91 may connect the fluid supply module 5 to the beverage dispenser 6. That is, the sub channel 91 may have a first end 91a connected to the supply channel 55b and a second end 91b connected to the beverage dispensing channel 61.

The sub channel 91 may be connected between the pump 52 and the heater 53 with respect to the supply channel 55b. Also, the sub channel 91 may be connected to the connecting portion 61a of the second main channel 42 and the beverage dispensing valve 64 with respect to the beverage dispensing channel 61.

The fluid supplied by the pump 52 and the air pumped by the air pump 82 may be guided to the beverage dispensing channel 61 through the sub channel 91 and then may be dispensed to the dispenser 62. Thus, residual fluid or beverage remaining in the beverage dispenser 6 may be removed.

A sub valve 92 that opens and closes the sub channel 91 may be installed in the sub channel 91. The sub valve 92 may be opened to open the sub channel 91 when the beverage is dispensed, or cleaning is performed.

A sub check valve 93 that prevents the beverage in the beverage dispensing channel 61 from flowing back to the fluid supply module 5 may be installed in the sub channel 91. The sub check valve 93 may be disposed between the sub valve 92 and the beverage dispensing channel 61 with respect to the sub channel 91.

The sub channel 91 may function as a residual fluid removing channel of the fluid supply module 5. For example, when the air pump 82 is turned on in a state in which the air supply valve 159, the bypass valve 35, and the ingredient supply valve 310 are closed, the sub valve 92 may be opened, and the air injected into the air injection channel 81 may pass through the heater 53 to flow to the sub channel 91. Then, the air may pass through the sub valve 92 to flow to the beverage dispensing channel 61 and then may be dispensed to the dispenser 62. In this process, the air may be dispensed together with fluid from the fluid supply module 5, more particularly, the residual fluid remaining in the heater 53 and the supply channel 55b so that the residual fluid may be removed.

In addition, the sub channel 91 may serve as a cleaning channel. That is, when some of the beverage is dispensed from the dispenser 62 and when it is a long time until a next dispensing operation, fluid may flow through the sub channel 91 to clean the dispenser 62.

Figure 2:
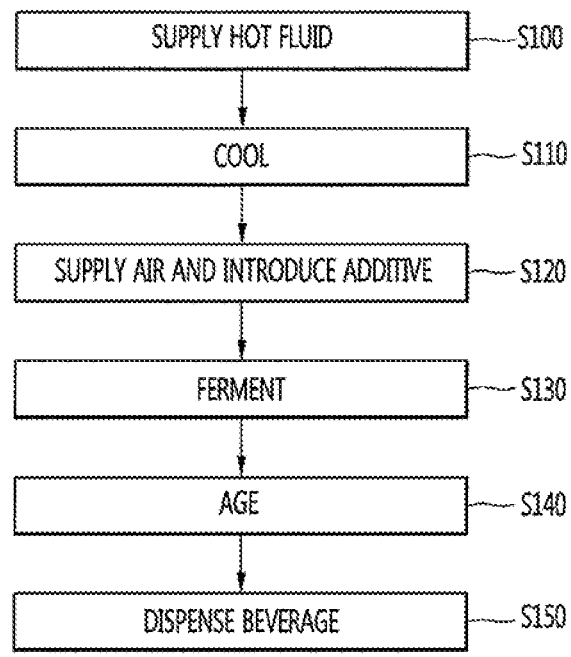
FIG. 2 is a flowchart of a method for controlling a beverage maker according to an embodiment.

FIG. 2 is a flowchart of a beverage making operation of a beverage maker according to an embodiment. Although beer is exemplified as a beverage made by the beverage maker in the drawings, a kind of beverage capable of being made by the beverage maker according to an embodiment is not limited to beer as mentioned above.

Hereinafter, a beverage making operation of the beverage maker according to an embodiment will be described with reference to FIG. 2 along with FIG. 1.

A user may open the fermentation lid 107 and may insert the fermentation container 12 into the fermentation module 1 to perform a beverage making operation. In this case, some ingredients (for example, malt) may be accommodated in the fermentation container 12. The malt may be in the form of malt oil. In an embodiment in which the fermentation container 12 is not utilized, the user may introduce some ingredients into the fermentation tank 112 of the fermentation module 1.

Thereafter, the user may close the fermentation lid 107 and the fermentation container 12 may be accommodated in the fermentation module 1. In this case, the inside of the fermentation module 1 may be closed by the fermentation lid 107. The user may insert ingredient containers C1, C2, C3 into the ingredient receivers 31, 32, 33 before or after the fermentation container 12 is seated.

The user may input a beverage making command through an input interface 420 (see FIG. 4), a remote controller, or a mobile terminal, for example. A controller 440 (see FIG. 4) may control the beverage maker in the beverage making operation according to the input of the beverage making command.

The beverage making operation may include a hot fluid supply step (S100). The hot fluid supply operation (S100) may be a liquid malt forming operation of forming liquid malt by evenly mixing the malt in the fermentation container 12 with a hot fluid, such as water.

In the hot fluid supply operation (S100), the controller 440 may turn on the pump 52 and may introduce fluid of the tank 51 into the fermentation container 12. According to an embodiment, to introduce hot fluid into the fermentation container 12, the fluid supply module 5 may further include the fluid heater 53. In this case, fluid discharged from the tank 51 may pass through the fluid supply pump 52, and may flow into the heater 53 and may be heated by the heater 53. Fluid (hot water) heated by the heater 53 may flow into the inside of the fermentation container 12 through the channels 55b, 41, 43, 42 between the fluid supply module 5 and the fermentation module 1. The hot fluid flowing into the fermentation container 12 may be mixed with the malt accommodated in the fermentation container 12, and the malt in the fermentation container 12 may be mixed with the fluid and gradually diluted. Since hot fluid is supplied to the fermentation container 12, the malt accommodated in the fermentation container 12 may be mixed with the hot fluid rapidly and evenly.

The controller 440 may perform the hot fluid supply operation (S100) until a cumulative amount of fluid detected by the flow meter 56 included in the fluid supply module 5 reaches a target amount of fluid, and when the cumulative amount of fluid detected by the flow meter 56 reaches the target amount of fluid, the controller 440 may end the hot fluid supply operation (S100). When the hot fluid supply operation (S100) is completed, the controller 440 may turn off the pump 52 and the heater 53.

In the middle of the hot fluid supply operation (S100), the controller 440 may control the air pump 82 to introduce air into the fermentation container 12. When air is introduced, the malt of the fermentation container 12 may be more smoothly mixed with the hot fluid.

The controller 440 may introduce fluid into the fermentation container 12 primarily and then stop, may inject air into the fermentation container 12 and then stop, and finally may introduce hot fluid into the fermentation container 12 secondarily and then stop. After completing the primary fluid introduction, the air injection, and the secondary fluid introduction in sequence, the controller 440 may end the hot fluid supply operation (S100).

One embodiment of the hot fluid supply operation (S100) may be performing only a hot fluid supply operation of supplying hot fluid. Another embodiment of the hot fluid supply operation (S100) may be performing a primary hot fluid supply operation of supplying hot fluid primarily, an air injection process of injecting air, and a secondary hot fluid supply operation of introducing hot water secondarily in sequence.

The beverage making operation may include a fermentation module cooling operation (S110). More specifically, when the hot fluid supply operation (S100) is completed, the fermentation module cooling operation (S110) to cool the fermentation tank 112 of the fermentation module 1 or the fermentation container 12 may be performed.

The controller 440 may control the temperature controller 11 included in the fermentation module 1 to cool the fermentation container 12. More specifically, the controller 440 may control the refrigerant cycle device 13 to cool the fermentation container 12. When the refrigerant cycle device 13 is driven, the fermentation container 12 may be gradually cooled, and the mixture (liquid malt) of the malt and the water accommodated in the fermentation container 12 may be cooled. The controller 440 may control the refrigerant cycle device 13 according to a temperature sensed in the temperature sensor 16 installed in the fermentation module 1. For example, the controller 440 may turn off the refrigerant cycle device 13 when the temperature sensed by the temperature sensor 16 reaches a target temperature of the cooling operation.

The beverage making operation may include an air supply and additive introduction operation (S120). The air supply and additive introduction operation S120 may be performed in the middle of the fermentation module cooling operation (S110) or may be performed after the fermentation module cooling operation (S110) is completed.

In the air supply operation of the air supply and additive introduction operation (S120), the controller 440 may turn on the air pump 82. While the air pump is turned on, air may pass through the channel between the air pump 82 and the fermentation module 1 and may be introduced into the fermentation container 12. The air introduced into the fermentation container 12 may collide with the liquid malt and may help the malt and the hot water be evenly mixed, and the air colliding with the liquid malt may increase dissolved oxygen (DO) of the liquid malt by supplying oxygen to the liquid malt. That is, agitation and aeration may be performed. As the DO of the liquid malt increases, yeast included in an additive introduced into the fermentation container 12 may act more effectively, and thus, the beverage may be smoothly fermented.

The controller 440 may turn on the air pump 82 for a predetermined period of time to supply air to the fermentation container 12, and when the predetermined period of time has elapsed, the controller 440 may turn off the air pump 82 to complete the air supply operation.

In addition, the beverage maker may perform the additive introduction operation of the air supply and additive introduction operation. In the additive introduction operation, ingredients (additive) accommodated in the ingredient supplier 3 may be introduced into the fermentation container 12. The controller 440 may turn on the pump 52. When the pump 52 is turned on, fluid in the tank 51 may pass through the pump 52 and the channels between the fluid supply module 5 and the ingredient supplier 3, and may flow into the ingredient containers C1, C2, C3 in the ingredient supplier 3. The fluid flowing into the ingredient containers C1, C2, C3 may be mixed with additives accommodated in the ingredient containers C1, C2, C3, and may flow into the fermentation container 12 along with the additives.

The controller 440 may complete the additive introduction operation when a cumulative amount of fluid detected by the flow meter 56 after the additive introduction operation has been initiated reaches a predetermined amount of fluid. When the additive introduction operation is completed, the controller 440 may turn off the pump 52.

According to an embodiment, the beverage maker may control the cooling operation (S110) and the air supply and additive introduction operation (S120) to prevent backflow of bubbles generated from the liquid malt in the air supply operation to the gas discharge channel 71. This will be described hereinafter with reference to FIGS. 3 to 12.

When the additive introduction operation S120 is completed, the controller 440 may display an ingredient container removal message indicating that the ingredient containers C1, C2, C3 may be removed on a display 132 (see FIG. 4), and the user may remove the empty ingredient containers from the ingredient supplier 3.

The beverage making operation may include a fermentation operation (3130). For example, the fermentation operation (S130) may include a primary fermentation operation and a secondary fermentation operation.

In the primary fermentation operation, the controller 440 may control the temperature controller 11 to maintain the temperature sensed by the temperature sensor 16 at a primary fermentation target temperature (for example, 21° C.). The controller 440 may periodically open and close the gas discharge valve 73 (or the pressure release valve 76) of the gas discharger 7, and may store pressure detected at the gas pressure sensor 72 included in the gas discharger 7 while the gas discharge valve 73 is being closed in a memory 430 (see FIG. 4). The controller 440 may complete the primary fermentation operation when a change in pressure periodically detected at the gas pressure sensor 72 exceeds a primary fermentation target pressure.

After completing the primary fermentation operation, the controller 440 may initiate the secondary fermentation operation. In the secondary fermentation operation, the controller 440 may control the temperature controller 11 such that the temperature measured at the temperature sensor 16 reaches a secondary fermentation target temperature.

After initiating the secondary fermentation operation, the controller 440 may periodically open and close the gas discharge valve 73 of the gas discharger 7, and may store a pressure sensed at the gas pressure sensor 72 while the gas discharge valve 73 is being closed in the memory 430. When a change in pressure periodically detected at the gas pressure sensor 72 exceeds a second fermentation target pressure, the controller 440 may determine that the secondary fermentation is completed and may complete the secondary fermentation operation.

The beverage making operation may include an aging operation (S140). More specifically, when the fermentation operation (S130) is completed, the aging operation (S140) may be performed.

In the aging operation, the controller 440 may wait for an aging time, and may control the temperature controller 11 to maintain the temperature of the beverage between an upper limit value of a target aging temperature and a lower limit value of the target aging temperature for the aging time.

When the aging time has elapsed, the beverage making operation may be completed. However, according to circumstances, the aging operation (S140) may be omitted, and when the fermentation operation (3130) is completed, making of the beverage may be completed. The controller 440 may display completion of making of the beverage through the display 132.

The controller 440 may control the temperature controller 11 to maintain the temperature of the fermentation tank 112 or the fermentation container 12 between an upper limit value and a lower limit value of a target drinking temperature until a beverage dispensing operation (S150), which will be described hereinafter, is completed.

The beverage maker according to an embodiment may further include the beverage dispensing operation (S150) to dispense the beverage after the beverage is made. In the beverage dispensing operation (S150), the user may dispense the beverage by operating the lever 620 of the dispenser 62. When the user opens the dispenser 62, the beverage in the fermentation container 12 may pass through the channel between the fermentation module 1 and the dispenser 62 and may be dispensed to the outside through the dispenser 62.

The user may dispense the beverage through the dispenser 62 at least one time. That is, the beverage dispensing operation may be performed at least one time, and the controller 440 may determine whether dispensing of the beverage is completed using information, such as a time for which the dispenser 62 is opened.

The beverage maker may further include a cleaning operation of cleaning and sterilizing inner channels before the cooling operation 8100 or after the beverage dispensing operation 8150, although not illustrated. In addition, the cleaning operation may be performed by a user input in the middle of the beverage making operation, and in this case, the cleaning operation may be performed when the main valve 40 is closed and an additive is not accommodated in the ingredient supplier 3 as in the fermentation operation.

Hereinafter, a control operation of the beverage maker for the cooling operation (S110) and the air supply and additive introduction operation (S120) will be described with reference to FIGS. 3 to 12.

Figure 3:
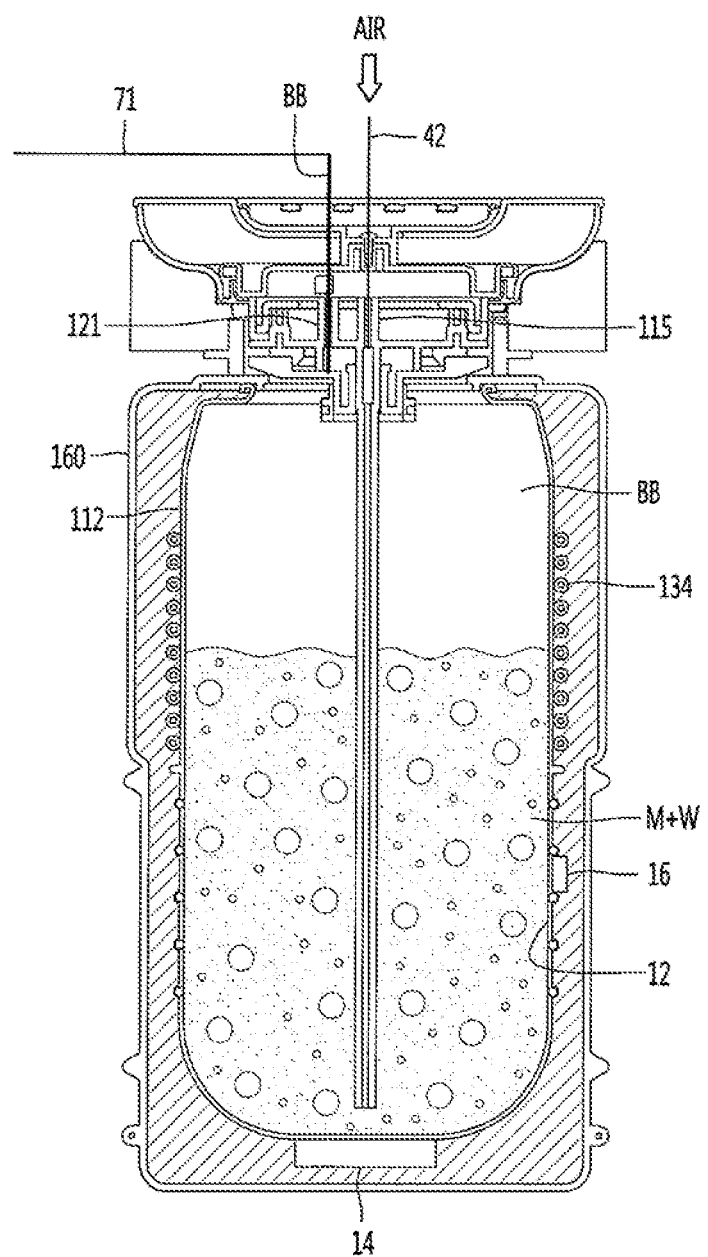
FIG. 3 is a schematic view to explain a bubble backflow phenomenon generated in a beverage maker.

FIG. 3 is a schematic view to explain a bubble backflow phenomenon generated in a beverage maker. Referring to FIG. 3, in the air supply operation described above in FIG. 2, the controller 440 (see FIG. 4) may turn on the air pump 82 and supply air to the fermentation container 12.

A portion of the air supplied to the fermentation container 12 may be included in liquid malt (M+W), and the rest may be discharged to the outside through the gas discharge channel 71. The air discharged to the outside may be discharged to an upper portion of the liquid malt (M+W) while being included in bubbles BB, and may be discharged to the outside through the gas discharge channel 71 as the bubbles BB burst.

In a related-art method, the air supply operation is performed while the refrigerant cycle device 13 is being driven according to the fermentation module cooling operation (S110). While the fermentation module cooling operation (S110) is being performed, a temperature of the evaporator 134 (for example, 0° C.) wound along the outer surface of the fermentation tank 112 may be greatly lower than a target temperature of the cooling operation (for example, 30° C.), and temperatures of a surface (inner surface) of the fermentation tank 112 and a surface of the fermentation container 12 corresponding to the evaporator 134 may also be greatly lower than the target temperature of the cooling operation.

It is common that viscosity of liquid increases as temperature decreases. Accordingly, viscosity of the liquid malt (M+W) adjacent to the evaporator 134 may increase, and as the viscosity increases, a possibility that the bubbles BB burst may be reduced.

As the air pump 82 continuously supplies air in the air supply operation, the bubbles BB in the fermentation container 12 may be accumulated and some of the accumulated bubbles BB may flow back along the opened gas discharge channel 71. As a result, the liquid malt in the bubbles BB flowing back to the gas discharge channel 71 remains in the gas discharge channel 71, and thus, hygiene of the gas discharge channel 71 may deteriorate and the beverage may not be smoothly made due to clogging of the gas discharge channel 71 or reduction in an inner diameter, and also, the beverage maker may be damaged or may be out of order.

A control operation of the beverage maker to solve the above-described problems will be described hereinafter with reference to FIGS. 4 to 12.

Figure 4:
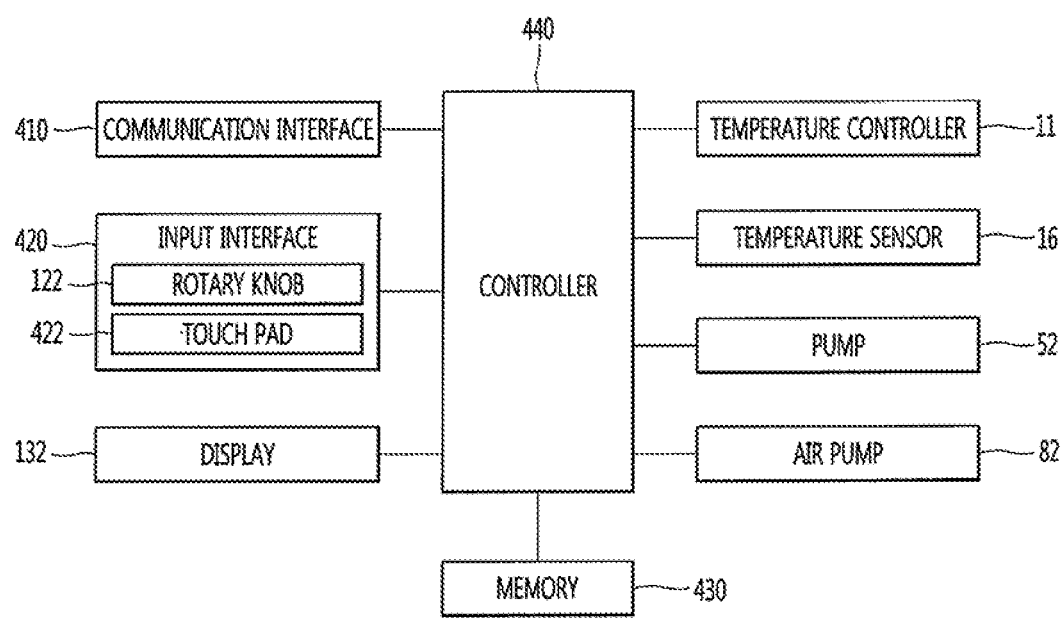
FIG. 4 is a schematic block diagram of a control configuration of a beverage maker according to an embodiment.

FIG. 4 is a schematic block diagram of a control configuration of a beverage maker according to an embodiment. Referring to FIG. 4, the beverage maker may include a communication interface 410, input interface 420, memory 430, and controller 440. The control components shown in FIG. 4 are not essential for implementing the beverage maker, and the beverage maker may include more or fewer components according to embodiments.

The beverage maker may include the communication interface 410 to communicate with a terminal, such as a smartphone, or a tablet PC, for example, or a server. For example, the controller 440 may receive a request for execution of the beverage making function from a terminal of a user, or may receive recipe information through the communication interface 410. In addition, the controller 440 may transmit a variety of information regarding operations of the beverage maker, a making state of the beverage, or a storage state, for example, to the terminal or the server through the communication interface 410.

The communication interface 410 may include a module that supports at least one of already-known various wired or wireless communication methods. For example, the communication interface 410 may include a module of short-range wireless communication, such as Bluetooth, or near field communication (NFC), for example, or a wireless Internet module, such as a wireless local area network (WLAN) module, for example.

The input interface 420 may receive various requests or commands from the user. For example, the input interface 120 may include a rotary knob 122, a touch pad 422 (or touch screen), other buttons, or a microphone, for example. The controller 440 may receive a request for execution of the beverage making function, recipe information, and/or control commands regarding various operations of the beverage maker, for example, through the input interface 420.

Display 132 may output a variety of information related to an operation or a state of the beverage maker, and a variety of information related to a beverage which is being made or stored in the beverage maker. The display 132 may be implemented using a liquid crystal display (LCD), a light emitting diode (LED), and/or an organic LED (OLED) display, for example. In the following description, it is assumed that the display 132 is formed in a circular shape; however, embodiments are not limited thereto, and the shape of the display 132 may be freely changed.

For example, the display 132 may output the information in the form of graphics or text. According to an embodiment, the beverage maker may further include a sound output interface to output information in the form of a voice, and the controller 440 may output the information through various combinations of graphics, a text, and/or a voice using the display 132 and the sound output interface.

The memory 430 may store a variety of information or data related to operations of the beverage maker. For example, the memory 430 may store predetermined recipe information regarding beverages to be made, various setting values, and/or various program data for operations of the beverage maker, for example. In addition, the memory 430 may store various graphic data related to screens displayed through the display 132.

The controller 440 may control overall operations of the beverage maker. The controller 440 may refer to at least one controller. The at least one controller may be implemented using hardware, such as a CPU, an application processor, a micro-computer (or mi-com), an integrated circuit, and/or an application specific integrated circuit (ASIC), for example.

For example, the controller 440 may control driving of the temperature controller 11, the pump 52, and the air pump 82 which are included in the beverage maker. In addition, the controller 440 may open/close valves provided in the channels in relation to control of the driving of the above-described components. The controller 440 may sense a temperature of the fermentation tank 112 or the fermentation container 12 using the temperature sensor 16, and may control driving of the above-described components 11, 52, 82 based on a result of sensing.

Figure 5:
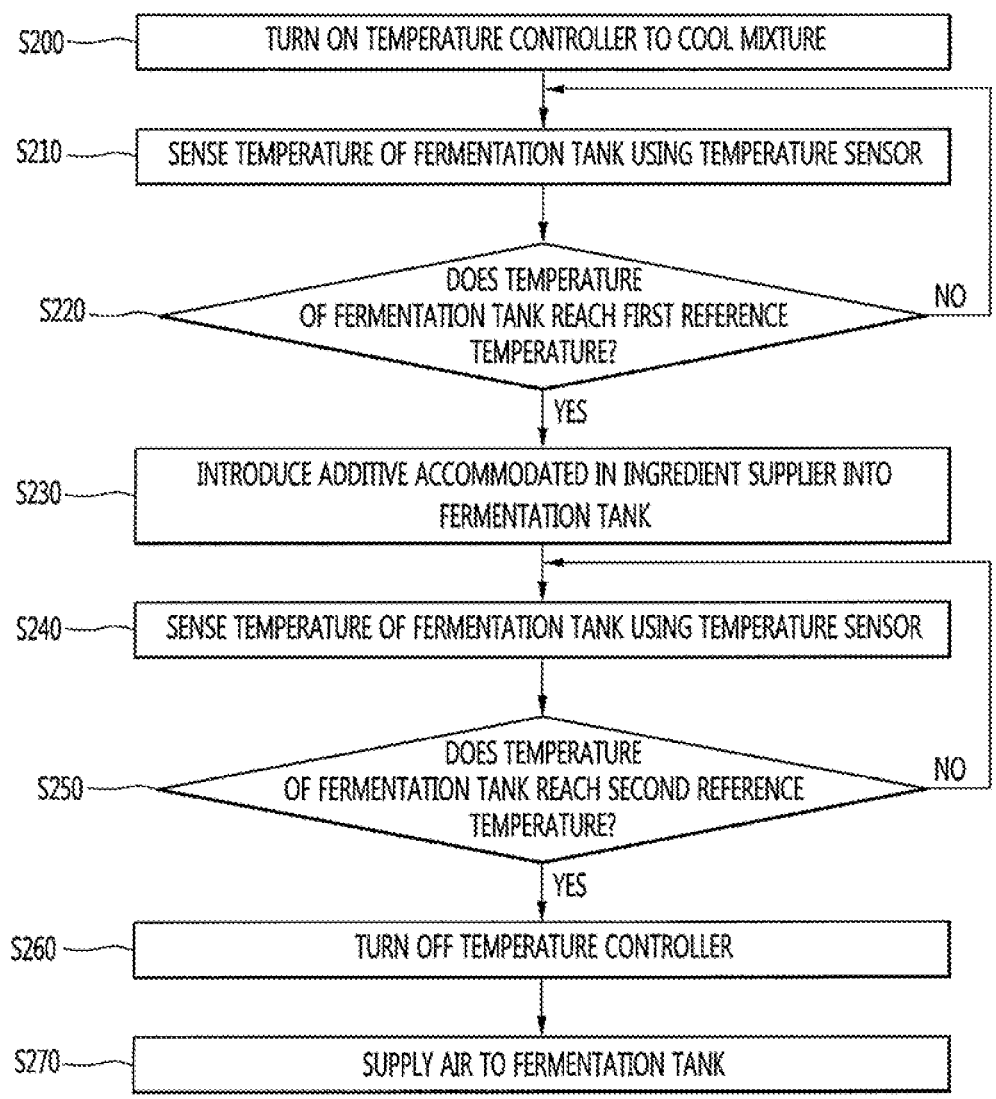
FIG. 5 is a flowchart of a beverage making operation of a beverage maker according to an embodiment.

FIG. 5 is a flowchart of a beverage making operation of a beverage maker according to an embodiment. Referring to FIG. 5, the beverage maker may turn on the refrigerant cycle device 13 included in the temperature controller 11 to cool a mixture of malt and hot water (liquid malt).

A temperature of the liquid malt may be about 50° C. to 70° C. On the other hand, yeast included in an additive to be added to the liquid malt may be activated (propagated or grown) to the maximum at about 28° C. to 35° C. In addition, at the fermentation operation performed after the additive is introduced, the temperature of the liquid malt may be set to 21° C. or 12° C. Accordingly, the beverage maker may perform the cooling operation (S110) to reduce the temperature of the liquid malt.

Accordingly, the controller 440 may control the temperature controller 11 to cool the liquid malt accommodated in the fermentation tank 112 (or the fermentation container 12). More specifically, the controller 440 may drive the compressor 131 (see FIG. 7) of the refrigerant cycle device 13 included in the temperature controller 11. As the compressor 131 is driven, refrigerant may be supplied to the evaporator 134 wound along the outer surface of the fermentation tank 112. The fermentation tank 112 may be cooled by the refrigerant supplied to the evaporator 134. As the fermentation tank 112 is cooled, the fermentation container 12 accommodated in the fermentation tank 112 and the liquid malt may also be cooled.

The beverage maker may sense a temperature of the fermentation tank 112 or the fermentation container 12 using the temperature sensor 16 while performing the cooling operation (S110) according to driving of the coolant cycle device 13 (S210). The controller 440 may periodically sense the temperature using the temperature sensor 16 provided on the outer surface of the fermentation tank 112, while performing the cooling operation (S110).

The evaporator 134 may be wound along the outer surface of the fermentation tank 112, such that a temperature of a surface of a portion of the fermentation tank 112 adjacent to the evaporator 134 is cooled to a temperature below zero or close to 0° C. Therefore, there may be a great difference from a temperature of the liquid malt in the fermentation tank 112. Accordingly, the temperature sensor 16 may be disposed at a position spaced apart from the evaporator 134, as shown in FIG. 1, thereby being able to sense the temperature of the liquid malt more exactly.

When the sensed temperature does not reach a first reference temperature (NO in S220), that is, when the sensed temperature is higher than the first reference temperature, the beverage maker may detect the temperature using the temperature sensor 16 until the sensed temperature reaches the first reference temperature (or is less than the first reference temperature). When the sensed temperature reaches the first reference temperature or is less than the first reference temperature (YES in S220), the beverage maker may introduce an additive accommodated in the ingredient supplier 3 into the fermentation tank 112 or the fermentation container 12 (S230).

When the temperature sensed by the temperature sensor 16 reaches the first reference temperature, or is lower than the first reference temperature in a middle of the cooling operation (S110), the controller 440 may perform the additive introduction operation described in FIG. 2. In this case, the cooling operation (110) may be continuously performed.

The first reference temperature may be set to a second reference temperature (for example, about 28° C. to 35° C.) at which yeast is activated to the maximum, or to a temperature higher than the second reference temperature by about 1° C. to 3° C. That is, the additive introduction operation may be performed in the middle of the cooling operation (S110), such that the total time required to make the beverage may be reduced.

Figure 9:
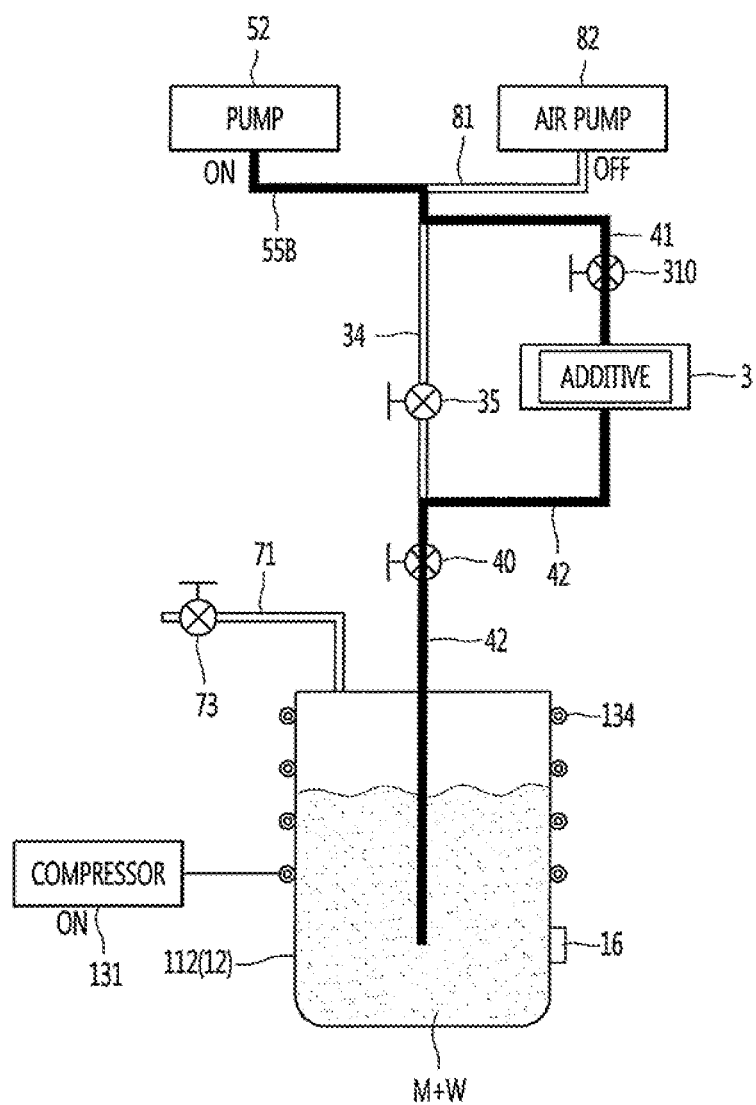
FIG. 9 is a view illustrating a beverage making operation performed by the beverage maker at the second time in the graph shown in FIG. 6.

A control operation of the controller 440 at the additive introduction operation will be described hereinafter with reference to FIG. 9.

The beverage maker may sense the temperature of the fermentation tank 112 or the fermentation container 12 using the temperature sensor 16 (S240). As the cooling operation (S110) is continuously performed in the middle of the additive introduction operation or after the additive introduction operation, the controller 440 may periodically sense the temperature using the temperature sensor 16.

When the sensed temperature does not reach the second reference temperature (NO in S250), that is, when the sensed temperature is higher than the second reference temperature, the beverage maker may sense the temperature using the temperature sensor 16 until the sensed temperature reaches the second reference temperature (or is less than the second reference temperature).

When the sensed temperature reaches the second reference temperature or is less than the second reference temperature (YES in S250), the beverage maker may finish the cooling operation (S110) by turning off the temperature controller 11 (or refrigerant cycle device 13) (S260). For example, the second reference temperature may correspond to a temperature at which yeast is activated to the maximum (about 28° C. to 35° C.).

When the temperature sensed by the temperature sensor 16 reaches the second reference temperature, the controller 440 may finish the cooling operation (S110) by turning off driving of the compressor 131 included in the refrigerant cycle device 13. After turning off the refrigerant cycle device 13, the beverage maker may perform the air supply operation of supplying air to the fermentation tank 112 or the fermentation container 12 (S270).

As the refrigerant cycle device 13 is turned off, supply of the refrigerant to the evaporator 134 may be stopped. Accordingly, the temperature of the surface of the fermentation tank 112 adjacent to the evaporator 134 may gradually increase to the temperature of the liquid malt.

After turning off the refrigerant cycle device 13, the controller 440 may control the air pump 82 to supply air to the liquid malt in the fermentation tank 112 or the fermentation container 12. A portion of the air supplied to the liquid malt may dissolve in the liquid malt, and the rest may be discharged to the outside through the gas discharge channel 71. The air discharged to the outside may be discharged to the upper portion of the liquid malt while being included in bubbles, and may be discharged to the outside through the gas discharge channel 71 as the bubbles burst.

Compared to the beverage maker of FIG. 3, the beverage maker according to an embodiment may perform the air supply operation after the cooling operation (S120) is completed. That is, as the temperature of the portion of the fermentation tank 112 adjacent to the evaporator 134 gradually increases to the temperature of the liquid malt, viscosity of the liquid malt adjacent to the fermentation tank 112 may be reduced. Accordingly, the bubbles smoothly burst, and thus, a backflow phenomenon caused by accumulation of bubbles may be effectively prevented.

Hereinafter, operations of the beverage maker according to an embodiment will be described with reference to FIGS. 6 to 11.

Figure 6:
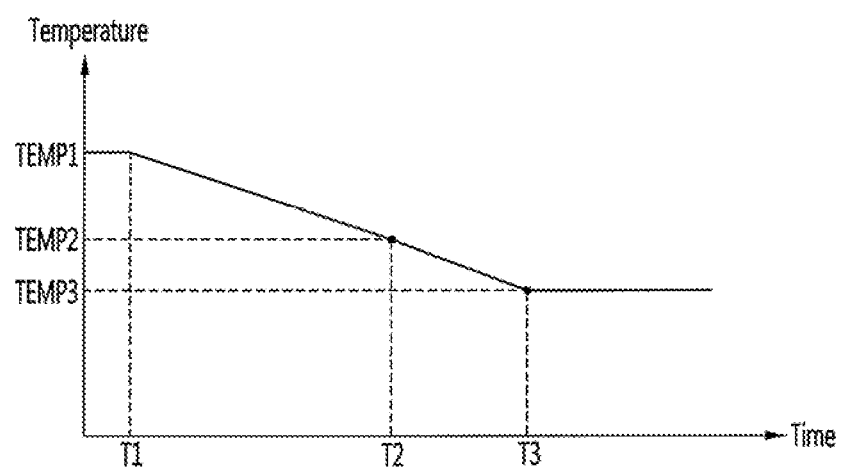
FIG. 6 is a graph illustrating a change in temperature which is sensed by a temperature sensor when the beverage maker is operated according to the embodiment shown in FIG. 5.

FIG. 6 is a graph illustrating a change in temperature sensed by the temperature sensor when the beverage maker is operated according to the embodiment shown in FIG. 5.

Referring to FIG. 6, when hot fluid is supplied to the fermentation tank 112 or the fermentation container 12 according to the supply hot fluid operation (S100) of FIG. 2, a temperature sensed by the temperature sensor 16 may be a first temperature TEMP1. For example, the first temperature TEMP1 may be about 50° C. to 70° C.

When the hot fluid supply operation (S100) is completed at a first time T1, the cooling operation (S110) may be performed. As the cooling operation (S110) is performed, the temperature sensed by the temperature sensor 16 may be reduced over time.

At a second time T2 at which the temperature sensed by the temperature sensor 16 is a second temperature TEMP2, the beverage maker may perform the above-described additive introduction operation (S120) of FIG. 2 and (S230) of FIG. 5. That is, the second temperature TEMP2 may correspond to the first reference temperature of FIG. 5. As the beverage maker continuously performs the cooling operation regardless of the additive introduction operation, the temperature sensed by the temperature sensor 16 may be continuously reduced.

At a third time T3 at which the temperature sensed by the temperature sensor 16 is a third temperature TEMP3, the beverage maker may finish the cooling operation, and may perform the above-described air supply operation (S120) of FIG. 2 and operation (S270) of FIG. 5. That is, the third temperature TEMP3 may correspond to the second reference temperature of FIG. 5.

After the air supply operation is performed for a predetermined period of time, the beverage maker may control the temperature controller 11 to reduce the temperature in the fermentation tank 112 to a target temperature of the fermentation operation although this operation is not illustrated. While performing the fermentation operation, the beverage maker may control the temperature controller 11 to maintain the temperature in the fermentation tank 112 at the target temperature of the fermentation operation.

Figure 7:
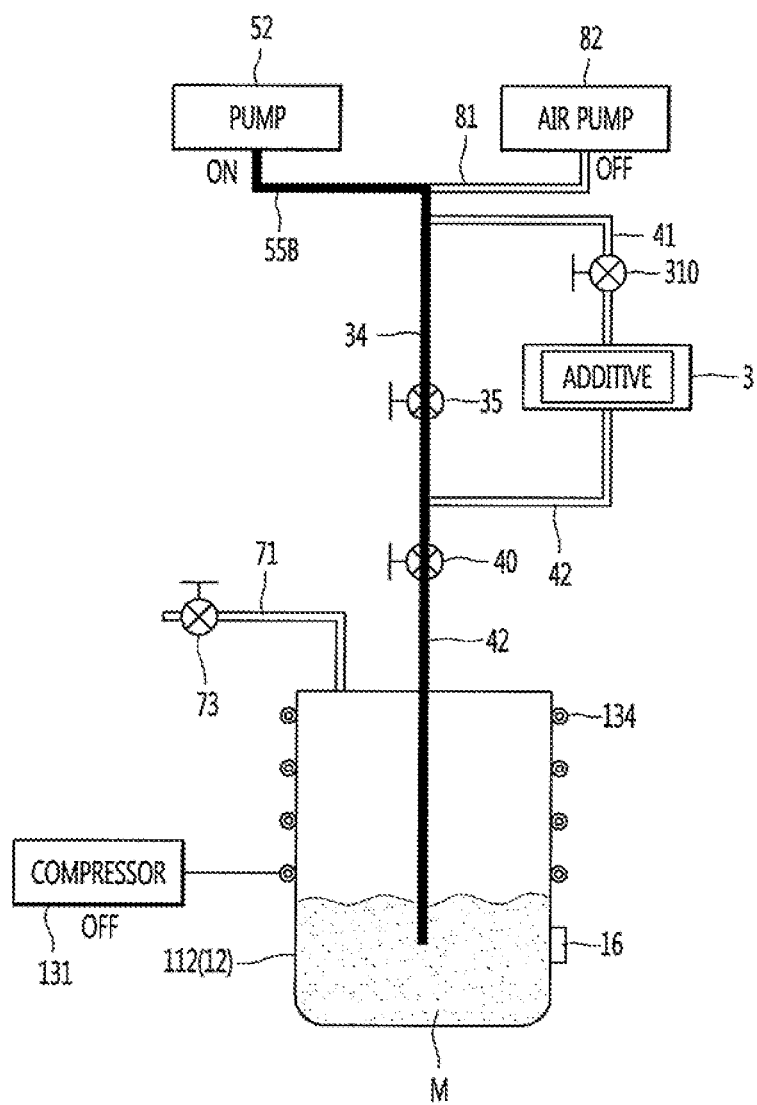
FIG. 7 is a view illustrating a beverage making operation performed by the beverage maker before a first time in the graph shown in FIG. 6.
Figure 8:
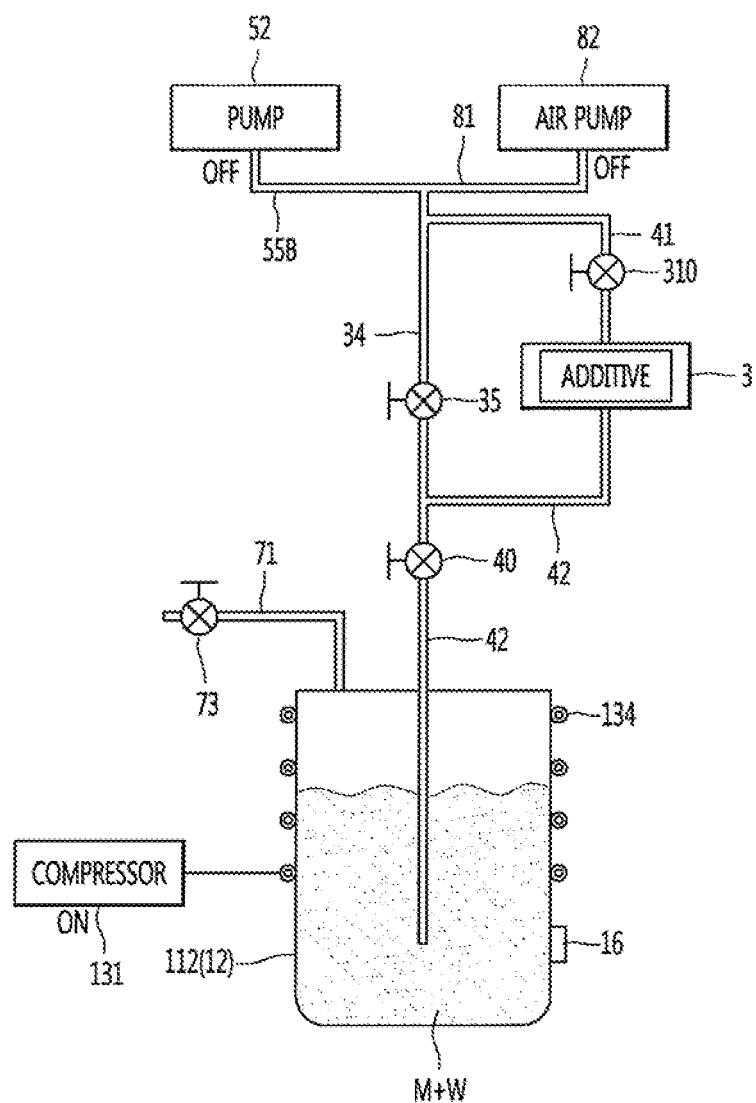
FIG. 8 is a view illustrating a beverage making operation performed by the beverage maker between the first time and a second time in the graph shown in FIG. 6.
Figure 10:
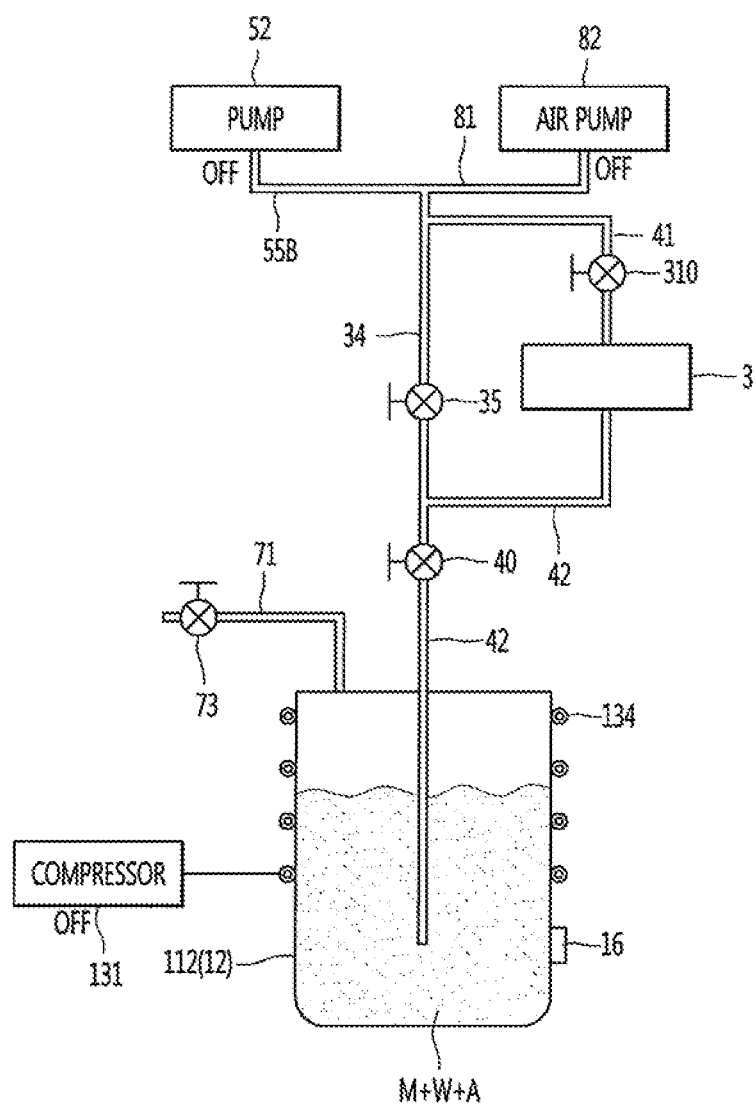
FIG. 10 is a view illustrating a beverage making operation performed by the beverage maker at a third time in the graph shown in FIG. 6.
Figure 11:
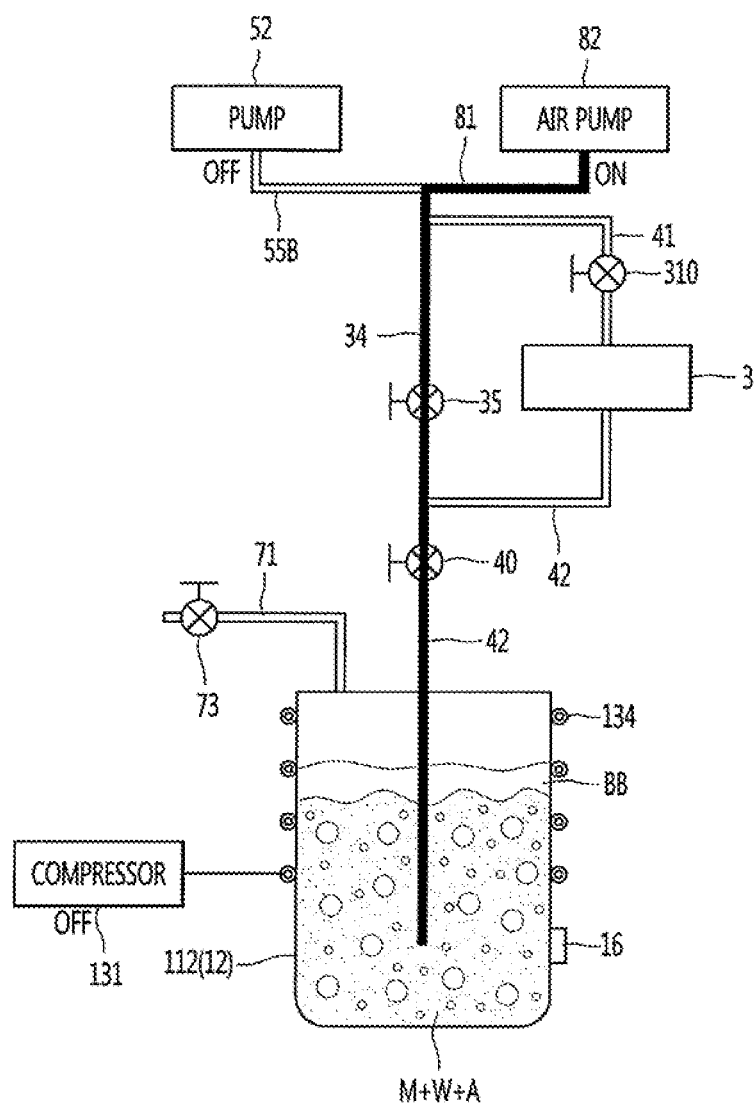
FIG. 11 is a view illustrating a beverage making operation performed by the beverage maker after the third time in the graph shown in FIG. 6.

FIG. 7 is a view illustrating a beverage making operation performed by the beverage maker before the first time in the graph shown in FIG. 6. FIG. 8 is a view illustrating a beverage making operation performed by the beverage maker between the first time and the second time in the graph shown in FIG. 6. FIG. 9 is a view illustrating a beverage making operation performed by the beverage maker at the second time in the graph shown in FIG. 6. FIG. 10 is a view illustrating a beverage making operation performed by the beverage maker at the third time in the graph shown in FIG. 6. FIG. 11 is a view illustrating a beverage making operation performed by the beverage maker after the third time in the graph shown in FIG. 6.

In FIGS. 7 to 11, the configuration of the beverage maker shown in FIG. 1 is simplified for convenience of explanation. Referring to FIGS. 6 and 7, the hot fluid supply operation (S100) of FIG. 2 may be performed before the first time T1. In the hot fluid supply operation (S100), the controller 440 may turn on the pump 52. The controller 440 may turn on the heater 53 although not illustrated.

Hot fluid, such as water supplied by the pump 52 may be supplied to the fermentation tank 112 or the fermentation container 12 through the supply channel 55b connected with the pump 52, the bypass channel 34 connected with the supply channel 55b, and the second main channel 42 connected between the bypass channel 34 and the fermentation module 1. To achieve this, the controller 440 may open the bypass valve 35 and the main valve 40, and may close the ingredient supply valve 310. In FIGS. 7 to 11, the controller 440 may keep the gas discharge valve 73 open.

The hot fluid, such as water supplied to the fermentation tank 112 or the fermentation container 12 may be mixed with malt (M), thereby forming liquid malt (M+W). Referring to FIG. 8, the hot fluid supply operation (S100) may be completed and the cooling operation (S110) may be performed at the first time T1 of FIG. 6.

The controller 440 may turn off the pump 52 as the hot fluid supply operation (S100) is completed. According to an embodiment, the controller 440 may close the bypass valve 35 and the main valve 40.

The controller 440 may turn on the compressor 131 included in the refrigerant cycle device 14 to perform the cooling operation (S110). As the compressor 131 is turned on, a refrigerant may be supplied to the evaporator 134 and a temperature of the liquid malt (M+W) may be gradually reduced.

The controller 440 may periodically sense a temperature using the temperature sensor 16. Referring to FIG. 9, at the second time T2 of FIG. 6, that is, when the temperature sensed by the temperature sensor 16 reaches the second temperature TEMP2 (=first reference temperature), the beverage maker may perform the additive introduction operation.

The controller 440 may open the main valve 40 to introduce an additive accommodated in the ingredient supplier 3 into the liquid malt (M+W). In addition, the controller 440 may turn on the pump 52 to supply fluid to the ingredient supplier 3 to effectively introduce the additive in a powdery form or a liquid form into the liquid malt (M+W).

The fluid supplied by the pump 52 may be supplied to the ingredient supplier 3 through the supply channel 55b and the first main channel 41 connecting the supply channel 55b and the ingredient supplier 3. To achieve this, the controller 440 may close the bypass valve 35 and may open the ingredient supply valve 310. The fluid supplied to the ingredient supplier 3 may be introduced into the fermentation tank 112 or the fermentation container 12 along with the additive through the second main channel 42. As the cooling operation (S110) is performed regardless of the additive introduction operation, the controller 440 may keep the compressor 131 turned on and the temperature of the liquid malt (M+W) may be continuously reduced.

Referring to FIG. 10, as the additive accommodated in the ingredient supplier 3 is introduced into the fermentation tank 112 or the fermentation container 12, a mixture (M+W+A) of the liquid malt (M+W) and the additive (A) may exist in the fermentation tank 112 or the fermentation container 12. After the additive is introduced, the controller 440 may turn off the pump 52 to stop the supply of fluid. According to an embodiment, the controller 440 may close the ingredient supply valve 310 and the main valve 40.

At the third time T3 of FIG. 6, that is, when the temperature sensed by the temperature sensor 16 reaches the third temperature TEMP3 (=second reference temperature), the beverage maker may finish the cooling operation (S110). That is, the controller 440 may finish cooling of the mixture (M+W+A) by turning off the compressor 131.

Referring to FIG. 11, after the compressor 131 is turned off, the beverage maker may perform the air supply operation. The controller 440 may turn on the air pump 82. The air pumped by the air pump 82 may be supplied to the mixture (M+W+A) in the fermentation tank 112 or the fermentation container 12 through the air injection channel 81 connected with the air pump 82, the bypass channel 34 connected with the air injection channel 81, and the second main channel 42 between the bypass channel 34 and the fermentation module 1. To achieve this, the controller 440 may open the bypass valve 35 and the main valve 40, and may close the ingredient supply valve 310.

A portion of the air supplied to the mixture (M+W+A) may dissolve in the mixture (M+W+A). In particular, a portion of oxygen included in the air dissolves in the mixture (M+W+A), such that DO of the mixture may increase. As the DA increases, fermentation of the mixture by yeast introduced in FIG. 9 may be more effectively performed.

The rest of the air supplied to the mixture (M+W+A) may be discharged to the outside of the mixture (M+W+A), and may be discharged to the outside of the beverage maker through the gas discharge channel 71. As described above, the air discharged to the outside may be discharged to the upper portion of the mixture (M+W+A) while being included in bubbles BB, and may be discharged to the outside through the gas discharge channel 71 as the bubbles BB burst.

As the air supply operation is performed after the cooling operation (S110) is finished unlike in FIG. 3, the temperature of the surface of the fermentation tank adjacent to the evaporator 134 may be higher than the temperature in FIG. 3. Accordingly, as viscosity of the mixture (M+W+A) adjacent to the surface of the fermentation tank is relatively low, the bubbles BB may burst more smoothly. As a result, as an amount of bubbles BB accumulated on the mixture (M+W+A) is reduced, the bubbles BB may not flow back through the gas discharge channel 71.

According to an embodiment, the air pumped by the air pump 82 may be supplied to the fermentation tank 112 or the fermentation container 12 through the air injection channel 81, the first main channel 41 between the air injection channel 81 and the ingredient supplier 3, and the second main channel 42. Accordingly, the fluid or additive remaining in the ingredient supplier 3 may be discharged by the air, and may be introduced into the fermentation tank 112 or the fermentation container 12.

That is, according to an embodiment, after completing the cooling operation of the liquid malt, that is, after finishing driving of the refrigerant cycle device 13, the beverage maker may supply air to the liquid malt, such that a problem of backflow of bubbles to the gas discharge channel 71, caused by accumulation of bubbles generated when air is supplied, may be solved.

Figure 12:
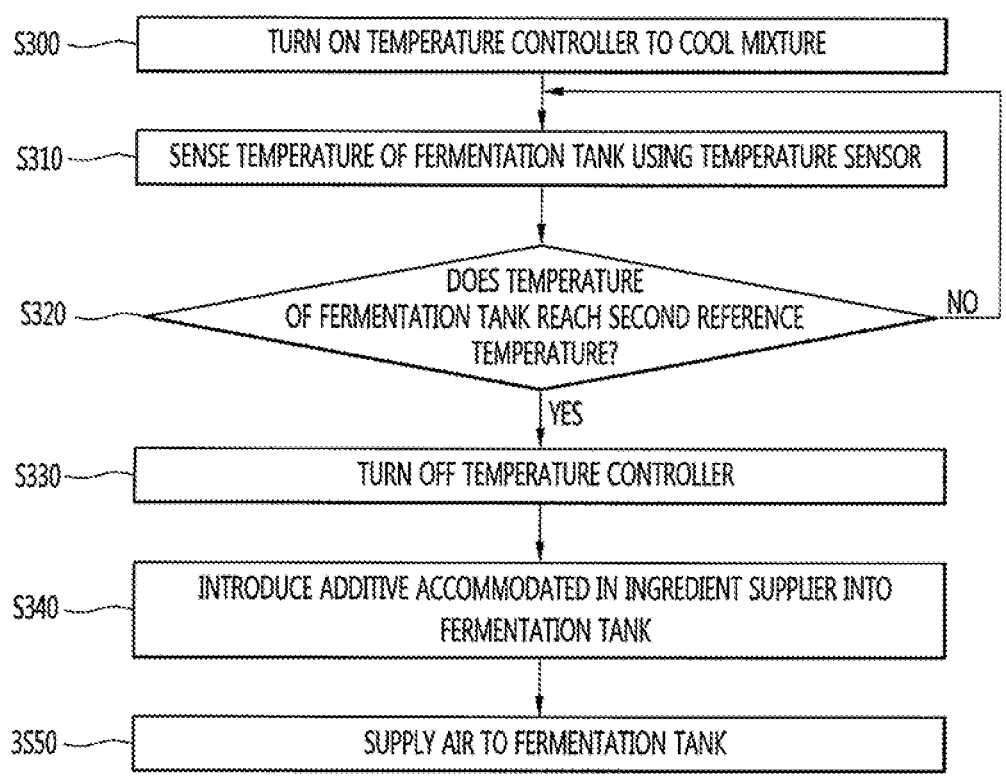
FIG. 12 is a flowchart of another beverage making operation of the beverage maker according to an embodiment.

FIG. 12 is a flowchart of a beverage making operation of a beverage maker according to another embodiment. As operations S300 and S310 of FIG. 12 are substantially the same as operations S200 and S210 of FIG. 5, detailed description thereof has been omitted.

When the temperature sensed by the temperature sensor 16 reaches the second reference temperature (YES in S320), the beverage maker may turn off the temperature controller 11 and may finish the cooling operation (S330). After turning off the temperature controller 11, the beverage maker may introduce the additive accommodated in the ingredient supplier 3 into the fermentation tank 112 or the fermentation container 12 (S340).

That is, unlike in the embodiment of FIG. 5, the beverage maker may not perform the additive introduction operation before the temperature sensed by the temperature sensor 16 reaches the second reference temperature. More specifically, when the temperature sensed by the temperature sensor 16 reaches the second reference temperature or is less than the second reference temperature, the controller 440 may turn off the compressor 131 of the refrigerant cycle device 13.

In addition, the controller 440 may turn on the pump 52 and may open the ingredient supply valve 310 and the main valve 40, thereby supplying fluid to the ingredient supplier 3. The fluid supplied to the ingredient supplier 3 may be introduced into the fermentation tank 112 or the fermentation container 12 along with the additive accommodated in the ingredient supplier 3.

After the additive introduction operation is performed, the beverage maker may perform the air supply operation to supply air to the fermentation tank 112 or the fermentation container 12 (S350). In the same way as in FIG. 5, the beverage maker may solve the problem of backflow of bubbles to the gas discharge channel 71 by performing the air supply operation after the cooling operation (S110) is finished.

According to various embodiments disclosed herein, the beverage maker increases DO in the mixture by supplying air to the mixture of ingredients and water, such that the mixture may be smoothly fermented. In addition, the beverage maker may prevent deterioration of bubble burst caused by viscosity of the mixture by supplying air after finishing the cooling operation for the mixture of beverage ingredients and water in the fermentation tank. Accordingly, a problem of backflow of bubbles to the gas discharge channel, caused by accumulation of bubbles in the fermentation tank, may be solved. By preventing the backflow of bubbles, degradation of hygiene of the gas discharge channel may be prevented and the beverage may be smoothly made.

Embodiments disclosed herein a beverage maker which injects air into a mixture of an ingredient and fluid, such as water in a fermentation tank or a fermentation container and increases dissolved oxygen of the mixture, thereby enabling smooth fermentation. Embodiments disclosed herein also provide a beverage maker which prevents backflow of bubbles generated from a mixture when air is injected into the mixture.

The beverage maker according to an embodiment may control a temperature controller to perform cooling of the fermentation tank accommodating the mixture, and when a temperature of the fermentation tank sensed by a temperature sensor is less than or equal to a reference temperature, may finish the cooling of the fermentation tank, and may control the air pump to supply air to the fermentation tank. Accordingly, bubbles generated in the fermentation tank when air is supplied smoothly burst, and backflow caused by accumulation of bubbles may be prevented.

The beverage maker introduces an additive into the fermentation tank in the middle of cooling the fermentation tank, such that the total time required to make a beverage may be reduced in comparison to the case in which the additive is introduced after the fermentation tank is cooled. The beverage maker may supply water to the ingredient supplier by using a pump in order to smoothly introduce the additive accommodated in the ingredient supplier into the fermentation tank.

The beverage maker may open an ingredient supply valve between the pump and the ingredient supplier, and may close a bypass valve between the pump and the fermentation tank in order to supply fluid to the ingredient supplier. The beverage maker may close the ingredient supply valve between the air pump and the ingredient supplier, and may open the bypass valve in order to supply air pumped by the air pump to the fermentation tank.

The details of one or more implementations are set forth in the accompanying drawings and the description. Other features will be apparent from the description and drawings, and from the claims.

The above-disclosed subject matter is to be considered illustrative, and not restrictive, and the appended claims are intended to cover all such modifications, enhancements, and other implementations, which fall within the scope. Thus, implementation of embodiments is to be considered illustrative, and not restrictive. Therefore, the scope is defined not by the detailed description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermentation tank having a space formed therein to make a beverage;
   a temperature controller configured to control a temperature of the fermentation tank;
   an air pump configured to supply air into the fermentation tank;
   a gas discharge channel connected with the fermentation tank and configured to discharge a portion of the air supplied into the fermentation tank;
   a temperature sensor configured to sense the temperature of the fermentation tank;
   a controller configured to control the temperature controller to cool the fermentation tank accommodating a mixture including ingredients of the beverage while making the beverage, sense the temperature of the fermentation tank using the temperature sensor, terminate cooling of the fermentation tank when the sensed temperature is less than or equal to a reference temperature, and control the air pump to supply air into the fermentation tank;
   an ingredient supplier configured to accommodate an additive to be introduced into the fermentation tank while making the beverage, wherein the controller is configured to control introduction of the additive into the fermentation tank before the air is supplied into the fermentation tank; and
   a pump configured to supply fluid, wherein the controller is configured to control the pump to supply the fluid into the ingredient supplier to introduce the additive accommodated in the ingredient supplier into the fermentation tank.

2. The beverage maker of claim 1, wherein the controller is configured to control the pump to introduce the additive into the fermentation tank when the sensed temperature is less than or equal to a first reference temperature, and terminate cooling of the fermentation tank when the sensed temperature is less than or equal to a second reference temperature which is lower than the first reference temperature.

3. The beverage maker of claim 1, wherein the controller is configured to control the pump to introduce the additive into the fermentation tank when the sensed temperature is less than or equal to the reference temperature.

4. The beverage maker of claim 1, further comprising:
   a first channel disposed between the pump and the ingredient supplier;
   an ingredient supply valve disposed in the first channel;
   a second channel connected with the pump and the air pump;
   a bypass valve disposed in the second channel;
   a third channel configured to connect the second channel and the ingredient supplier to the fermentation tank; and
   a main valve disposed in the third channel.

5. The beverage maker of claim 4, wherein the controller is configured to open the ingredient supply valve and the main valve and close the bypass valve to introduce the additive accommodated in the ingredient supplier into the fermentation tank.

6. The beverage maker of claim 4, wherein the controller is configured to open the bypass valve and the main valve and close the ingredient supply valve to supply air to the fermentation tank.

7. The beverage maker of claim 1, wherein temperature controller comprises:
an evaporator that surrounds a portion of an outer surface of the fermentation tank; and
a compressor configured to supply refrigerant to the evaporator.

8. The beverage maker of claim 7, wherein the temperature sensor is disposed on a portion of the outer surface of the fermentation tank spaced apart from the evaporator.

9. A beverage maker, comprising:
a fermentation tank having a space formed therein to make a beverage;
an evaporator that surrounds a portion of an outer surface of the fermentation tank;
a compressor configured to supply refrigerant to the evaporator;
an air pump configured to supply air into the fermentation tank;
a gas discharge channel connected with the fermentation tank and configured to discharge a portion of the air supplied into the fermentation tank;
a temperature sensor configured to sense the temperature of the fermentation tank;
a controller configured to control the compressor to cool the fermentation tank accommodating a mixture including ingredients of the beverage while making the beverage, sense the temperature of the fermentation tank using the temperature sensor, terminate cooling of the fermentation tank when the sensed temperature is less than or equal to a reference temperature, and control the air pump to supply air into the fermentation tank;
an ingredient supplier configured to accommodate an additive to be introduced into the fermentation tank while making the beverage, wherein the controller is configured to control introduction of the additive into the fermentation tank before the air is supplied into the fermentation tank; and
a pump configured to supply fluid, wherein the controller is configured to control the pump to supply the fluid into the ingredient supplier to introduce the additive accommodated in the ingredient supplier into the fermentation tank, wherein the controller is configured to control the pump to introduce the additive into the fermentation tank when the sensed temperature is less than or equal to a first reference temperature, and terminate cooling of the fermentation tank when the sensed temperature is less than or equal to a second reference temperature which is lower than the first reference temperature.

10. The beverage maker of claim 9, further comprising:
a first channel disposed between the pump and the ingredient supplier;
an ingredient supply valve disposed in the first channel;
a second channel connected with the pump and the air pump;
a bypass valve disposed in the second channel;
a third channel configured to connect the second channel and the ingredient supplier to the fermentation tank; and
a main valve disposed in the third channel, wherein the controller is configured to open the ingredient supply valve and the main valve and close the bypass valve to introduce the additive accommodated in the ingredient supplier into the fermentation tank, and wherein the controller is configured to open the bypass valve and the main valve and close the ingredient supply valve to supply air to the fermentation tank.

11. The beverage maker of claim 9, wherein the temperature sensor is disposed on a portion of the outer surface of the fermentation tank spaced apart from the evaporator.

\* \* \* \* \*